US011945535B2

(12) United States Patent
Hara et al.

(10) Patent No.: US 11,945,535 B2
(45) Date of Patent: Apr. 2, 2024

(54) POSTURE CONTROL ACTUATOR UNIT AND LEANING VEHICLE

(71) Applicant: YAMAHA HATSUDOKI KABUSHIKI KAISHA, Iwata (JP)

(72) Inventors: Nobuo Hara, Shizuoka (JP); Hidekazu Tsuboi, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 500 days.

(21) Appl. No.: 17/185,768

(22) Filed: Feb. 25, 2021

(65) Prior Publication Data

US 2021/0179224 A1 Jun. 17, 2021

Related U.S. Application Data

(63) Continuation-in-part of application No. PCT/JP2019/034102, filed on Aug. 30, 2019.

(30) Foreign Application Priority Data

Aug. 30, 2018 (JP) ................................ 2018-161335

(51) Int. Cl.
  *B62K 11/00* (2006.01)
  *B62J 45/415* (2020.01)
  *B62K 21/12* (2006.01)

(52) U.S. Cl.
  CPC ........... *B62K 11/007* (2016.11); *B62J 45/415* (2020.02); *B62K 21/12* (2013.01)

(58) Field of Classification Search
  CPC ...... B62K 11/007; B62K 21/12; B62K 5/027; B62K 5/05; B62K 2202/00; B62K 21/18;
  (Continued)

(56) References Cited

U.S. PATENT DOCUMENTS

| 2009/0139793 A1* | 6/2009 | Suzuki | ................... | B62K 21/00 |
| | | | | 180/446 |
| 2017/0106930 A1* | 4/2017 | Hara | ...................... | B62K 5/027 |
| 2018/0281886 A1* | 10/2018 | Mizuno | ..................... | B62D 9/02 |

FOREIGN PATENT DOCUMENTS

| EP | 1783023 A1 | 5/2007 |
| EP | 3581478 A1 | 12/2019 |

(Continued)

*Primary Examiner* — Paul N Dickson
*Assistant Examiner* — Shams Dhanani
(74) *Attorney, Agent, or Firm* — Rabin & Berdo, P.C.

(57) ABSTRACT

A leaning vehicle including a vehicle body frame that is configured to lean leftward and rightward respectively when the leaning vehicle is turning left and right, a steerable wheel supported by the vehicle frame body, a steering mechanism steering the steerable wheel, and a posture control actuator device. The posture control actuator device includes a posture control actuator that outputs power to control posture of the vehicle body frame, and an angular rate sensor that detects an amount of change per unit time of a rotation angle of the vehicle body frame around a rotation axis thereof, the rotation angle changing as the vehicle body frame is rotating around the rotation axis. The posture control actuator device is supported by the vehicle body frame, and is attachable to and detachable from the vehicle body frame. The posture control actuator and the angular rate sensor are not displaceable relative to each other.

8 Claims, 14 Drawing Sheets

(58) Field of Classification Search
CPC .. B62K 5/08; B62K 5/10; B62J 45/415; B62J 45/4151; B62D 37/00; B62D 9/02
See application file for complete search history.

(56) References Cited

FOREIGN PATENT DOCUMENTS

| | | | |
|---|---|---|---|
| JP | 2009-132271 | A | 6/2009 |
| JP | 2010228621 | A | 10/2010 |
| JP | 2012-076490 | A | 4/2012 |
| JP | 5191057 | B2 | 4/2013 |
| JP | 2013136313 | A | 7/2013 |
| JP | 2016-531046 | A | 10/2016 |
| JP | 2018-034531 | A | 3/2018 |

* cited by examiner

Fig.4
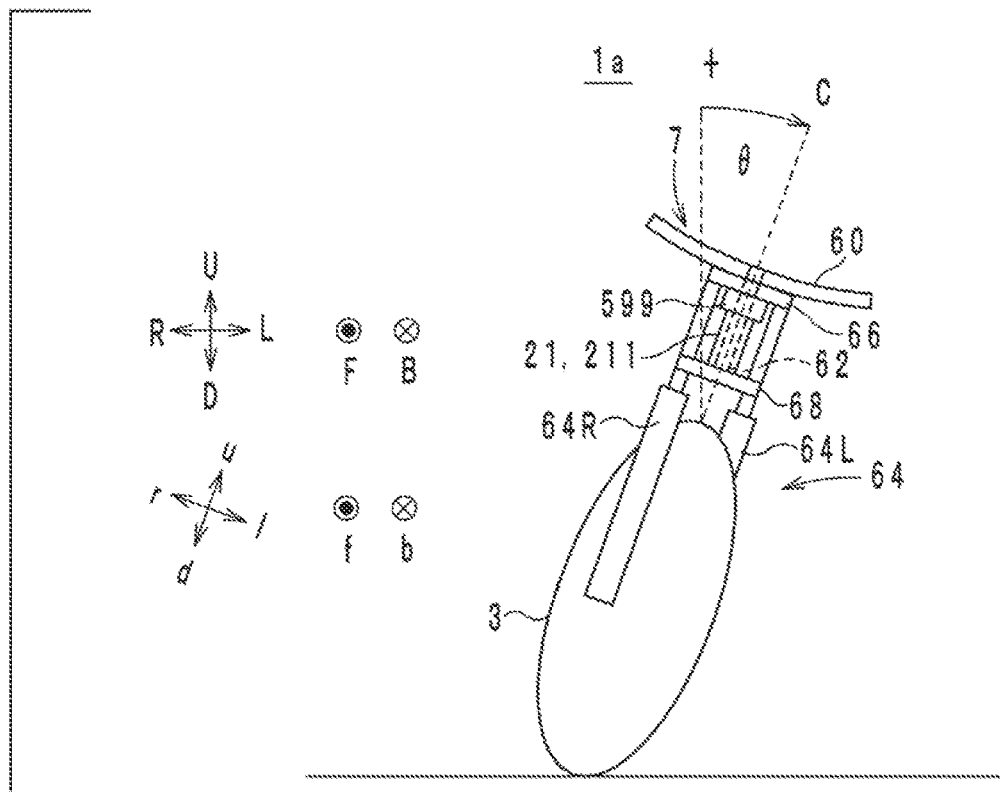
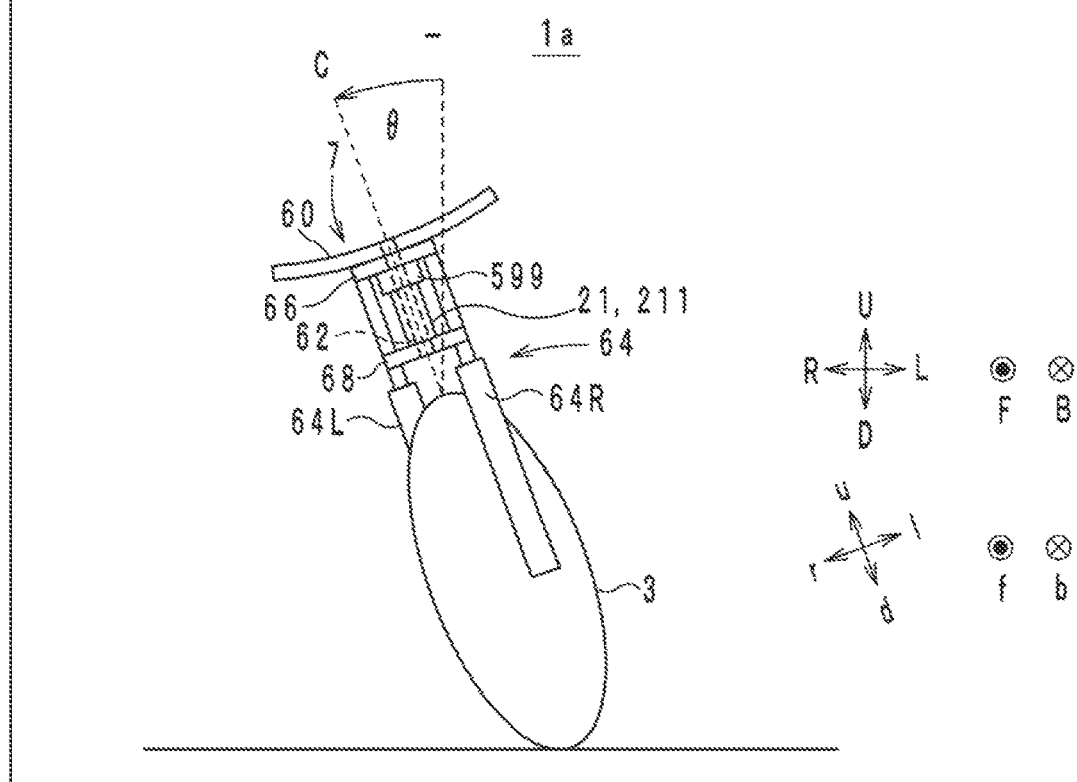

Fig.9
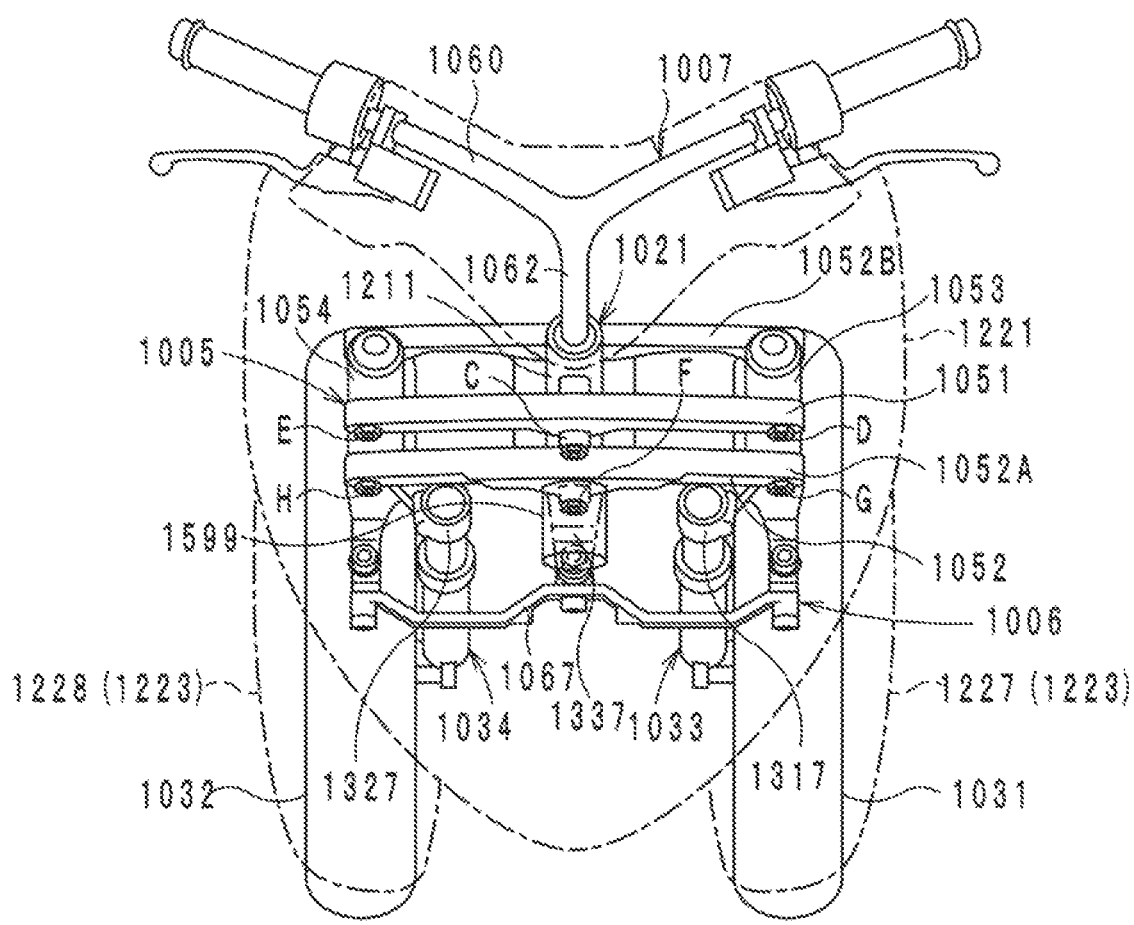
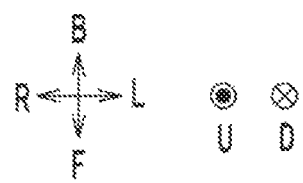
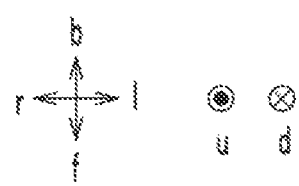

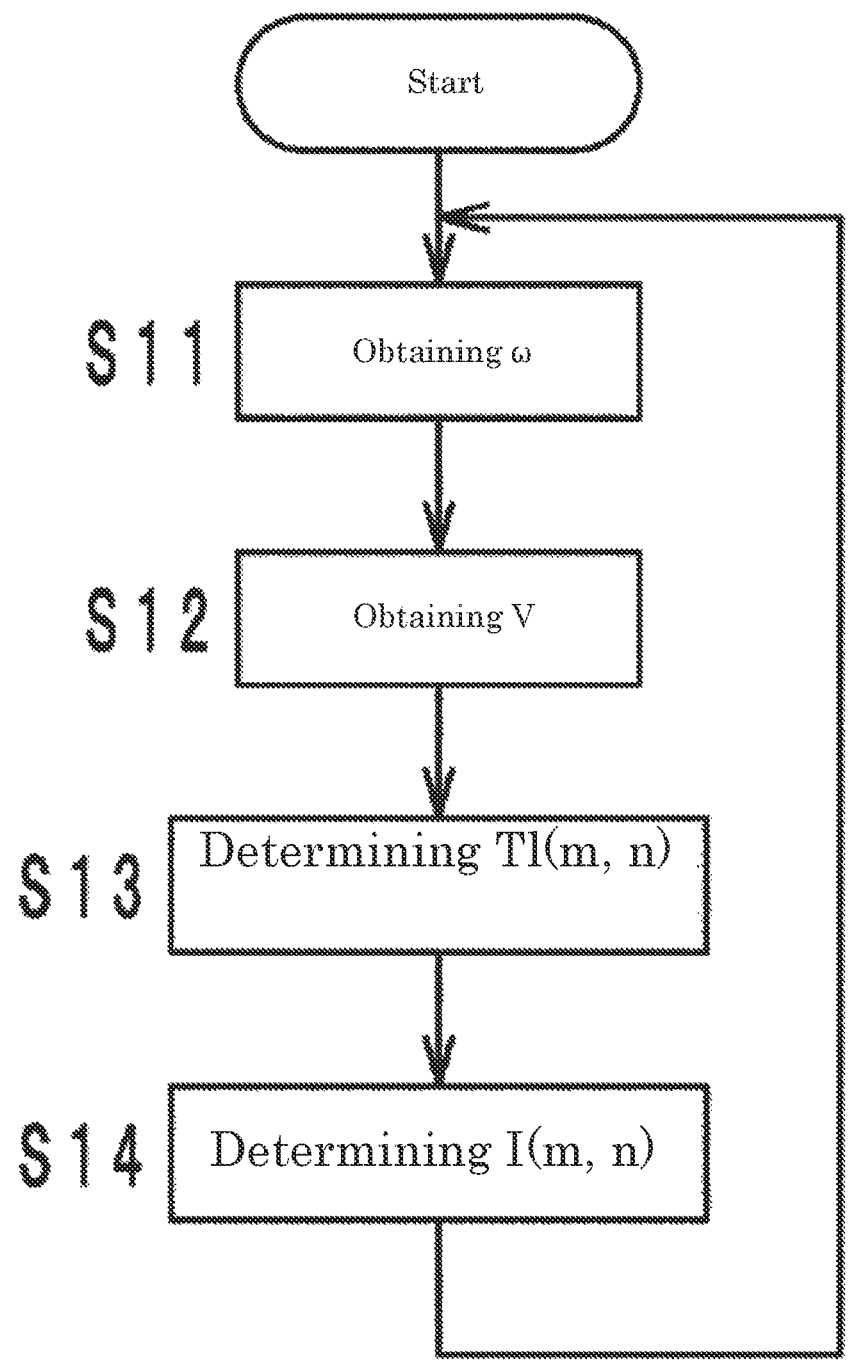

POSTURE CONTROL ACTUATOR UNIT AND LEANING VEHICLE

CROSS-REFERENCE TO RELATED APPLICATIONS

This is a continuation-in-part application of International Application PCT/JP2019/034102 filed on Aug. 30, 2019, which claims priority from a Japanese Patent Application No. 2018-161335, filed on Aug. 30, 2018. The contents of the applications are incorporated herein by reference.

TECHNICAL FIELD

The present teaching relates to a posture control actuator unit and a leaning vehicle including a posture control actuator configured to output a posture control torque to control the posture of a vehicle body frame.

BACKGROUND ART

For example, a motorcycle disclosed in Patent Literature 1 is known as a conventional leaning vehicle. This motorcycle includes a vehicle body frame and an IMU (inertial measurement unit). The vehicle body frame leans leftward when the motorcycle is turning left and leans rightward when the motorcycle is turning right. The IMU includes three kinds of angular rate sensors and three kinds of acceleration sensors. The IMU obtains the pitch rate, the yaw rate and the roll rate of the vehicle body frame from the three kinds of angular rate sensors. The IMU obtains the acceleration in an x-axis direction, the acceleration in a y-axis direction and the acceleration in a z-axis direction of the vehicle body frame from the three kinds of acceleration sensors. The x-axis direction is a left-right direction of the motorcycle in an upright posture. The y-axis direction is an up-down direction of the motorcycle in an upright posture. The z-axis direction is a front-back direction of the motorcycle in an upright posture. The pitch rate is an angular rate when the vehicle body frame is rotating around the x-axis. The yaw rate is an angular rate when the vehicle body frame is rotating around the y-axis. The roll rate is an angular rate when the vehicle body frame is rotating around the z-axis.

The IMU can calculate the speed of the motorcycle and the angle of the vehicle body frame, based on the pitch rate, the yaw rate, the roll rate, the acceleration in the x-axis direction, the acceleration in the y-axis direction and the acceleration in the z-axis direction. The IMU, for example, calculates a bank angle of the vehicle body frame based on the roll rate. The bank angle is an angle formed by the y-axis and a center line of the vehicle body frame in a backward view thereof. The center line of the vehicle body frame is a line extending along the y-axis from a center of the vehicle body frame in an upright posture with respect to a vehicle-body-frame-left-right direction in a backward view thereof. The vehicle body-frame-left-right direction is the left-right direction of the vehicle body frame. Thus, in the motorcycle disclosed in Patent Literature 1, the IMU detects the posture (angle) of the vehicle body frame, such as a bank angle or the like.

CITATION LIST

Patent Literature

Patent Literature 1: Japanese Unexamined Patent Application Publication (Translation of PCT Application) No. 2016-531046

SUMMARY OF INVENTION

Technical Problem

In leaning vehicles such as motorcycles, detection of a posture change (angular rate) such as a roll rate is required in some cases, depending on what kind of posture control is employed for posture control of the vehicle body frame. Then, in some leaning vehicles, the posture control of the vehicle body frame is possibly performed based on the roll rate detected by an angular rate sensor included in an IMU. For accurate posture control of the vehicle body frame, it is preferred to detect the roll rate accurately.

Therefore, the present invention provides a posture control actuator unit including an angular rate sensor that can detect a posture change of a vehicle body frame with high accuracy and a leaning vehicle.

Solution to Problem

The present inventors conducted studies about detection of a posture change (angular rate) of a vehicle body frame by use of an IMU. The IMU includes an acceleration sensor and an angular rate sensor. The acceleration sensor is to detect the acceleration of the vehicle body frame caused by a run of the leaning vehicle. The acceleration of the vehicle body frame includes an acceleration of the vehicle body frame caused by a run of the leaning vehicle and an acceleration of the vehicle body frame caused by engine vibration. The absolute value of the acceleration of the vehicle body frame caused by engine vibration is greater than the absolute value of the acceleration of the vehicle body frame caused by a run of the leaning vehicle. For example, the absolute value of the acceleration of the vehicle body frame caused by engine vibration is tens of G. On the other hand, the absolute value of the acceleration of the vehicle body frame caused by a run of the leaning vehicle is several G. The acceleration of the vehicle body frame caused by engine vibration is noise for detection of the acceleration of the vehicle body frame caused by a run of the leaning vehicle. Therefore, the acceleration sensor preferably detects the acceleration of the vehicle body frame caused by a run of the leaning vehicle while not detecting the acceleration of the vehicle body frame caused by engine vibration.

In the circumstances, such an IMU is typically attached to a vehicle body frame via an elastic member such as a rubber mount or the like. This makes it harder for engine vibration to propagate to the vehicle body frame, and the acceleration sensor can accurately detect the acceleration of the vehicle body frame caused by a run of the leaning vehicle.

However, the present inventors found that there are some cases in which the elastic member prevents the IMU from accurately detecting a posture change (angular rate) of the vehicle body frame. More specifically, when the vehicle body frame makes a posture change, an inertial force acts on the IMU, and the rubber mount is deformed. Accordingly, a posture change of the angular rate sensor of the IMU delays from the posture change of the vehicle body frame.

The present inventors conducted studies about what kind of sensor is necessary to detect a posture change of a vehicle body frame. Then, the present inventors found out that an angular rate sensor is necessary to detect a posture change of a vehicle body frame and that an acceleration sensor is not necessary. The present inventors conceived of not using the angular rate sensor of the IMU but using an angular rate sensor disposed outside the IMU for detection of a posture change of the vehicle body frame. Then, it would become possible to attach the angular rate sensor to the vehicle body frame not via an elastic member. This would inhibit a delay of a posture change of the angular rate sensor from a posture change of the vehicle body frame, and detection of a posture change of a leaning vehicle by use of an angular rate sensor would become more accurate.

However, an angular rate sensor is to detect a posture change (angular rate) of a vehicle body frame, and therefore, the angular rate sensor is required to be attached to the vehicle body frame in a proper position and in a proper direction (which will hereinafter be referred to as with high positional accuracy). The present inventors conducted studies about where in a vehicle body frame an angular rate sensor can be attached with high positional accuracy. The present inventors took notice of a posture control actuator used for posture control of the vehicle body frame. The posture control actuator is configured to output posture control power to control the posture of the vehicle body frame. Therefore, the posture control actuator is designed to be positioned at a predetermined angle to a roll axis or the like that is associated with a posture change of the vehicle body frame. For example, when the posture control actuator is an EPS (electric power steering) actuator, in some cases, the posture control actuator is positioned such that the rotation axis thereof is parallel to a steering shaft. For example, when the posture control actuator is an EPL actuator, in some cases, the posture control actuator is positioned such that the rotation axis thereof is parallel to a rotation axis of the vehicle body frame. Thus, a posture control actuator is attached to a vehicle body frame with high positional accuracy. Accordingly, the present inventors conceived of using an existing posture control actuator for attachment of an angular rate sensor to a vehicle body frame. In other words, the present inventors conceived of integrating an angular rate sensor and a posture control actuator into a posture control actuator unit (i.e., a posture control actuator device) and attaching the posture control actuator unit to a vehicle body frame.

(1) A posture control actuator unit for a leaning vehicle, the leaning vehicle including a vehicle body frame that is configured to lean in a leaning-vehicle-leftward direction when the leaning vehicle is turning left and to lean in a leaning-vehicle-rightward direction when the leaning vehicle is turning right,
the posture control actuator unit comprising:
  a posture control actuator configured to output posture control power to control posture of the vehicle body frame; and
  an angular rate sensor configured to detect an angular rate that is an amount of change per unit time of a rotation angle of the vehicle body frame around a rotation axis, the rotation angle changing as the vehicle body frame is rotating around the rotation axis;
  wherein the posture control actuator unit is supported by the vehicle body frame in such a manner as to be attachable to and detachable from the vehicle body frame, the posture control actuator and the angular rate sensor being incorporated in such a manner as not to be displaceable relative to each other.

The angular rate sensor of the posture control actuator unit of (1) can detect a posture change of the vehicle body frame with high accuracy. More specifically, the posture control actuator outputs posture control power to control the posture of the vehicle body frame. For this purpose, the posture control actuator unit is supported by the vehicle body frame in such a manner as to be attachable to and detachable from the vehicle body frame. Accordingly, a posture change of the posture control actuator is unlikely to delay from a posture change of the vehicle body frame. The posture control actuator and the angular rate sensor are incorporated in such a manner as not to be displaceable relative to each other. Accordingly, a posture change of the angular rate sensor is unlikely to delay a posture change of the vehicle body frame. Therefore, the angular rate sensor of the posture control actuator unit of (1) can detect a posture change of the vehicle body frame with high accuracy.

The angular rate sensor of the posture control actuator unit of (1) can detect a posture change of the vehicle body frame with high accuracy. More specifically, the posture control actuator outputs posture control power to control the posture of the vehicle body frame. For this purpose, the posture control actuator is designed to be positioned at a predetermined angle to a roll axis or the like that is associated with a posture change of the vehicle body frame. For example, when the posture control actuator is an EPS actuator, the posture control actuator may be positioned such that the rotation axis thereof is parallel to a steering shaft. For example, when the posture control actuator is an EPL actuator, the posture control actuator may be positioned such that the rotation axis thereof is parallel to a rotation axis of the vehicle body frame. Thus, the posture control actuator is attached to the vehicle body frame with high positional accuracy. The posture control actuator and the angular rate sensor are incorporated in such a manner as not to be displaceable relative to each other. Accordingly, the angular rate sensor is attached to a sensor mounting position of the vehicle body frame with high accuracy. Therefore, the angular rate sensor of the posture control actuator unit of (1) can detect a posture change of the vehicle body frame with high accuracy.

Also, the posture control actuator of the posture control actuator unit of (1) is attached to the vehicle body frame with high positional accuracy. Accordingly, it is easy to make the axis for the angular rate detection carried out by the angular rate sensor almost parallel to the rotation axis of the vehicle body frame. Then, the angular rate sensor can detect the angular rate of the vehicle body frame with high accuracy. Even when the axis for the angular rate detection carried out by the angular rate sensor is not parallel to the rotation axis of the vehicle body frame, it is easy to identify the angle formed between the axis for the angular rate detection carried out by the roll rate sensor and the rotation axis of the vehicle body frame. Accordingly, it is easy to make a correction to the roll rate detected by the angular rate sensor.

The posture control actuator unit of (1) can be downsized. More specifically, in the posture control actuator unit of (1), the posture control actuator and the angular rate sensor are incorporated in such a manner as not to be displaceable relative to each other. Accordingly, it is not necessary to provide a mount for attachment of the roll rate sensor to the vehicle body frame. Therefore, the number of components of the posture control actuator unit of (1) can be reduced, and the posture control actuator unit of (1) can be downsized.

(2) The posture control actuator unit according to (1), further comprising a posture control actuator controller configured to control the posture control actuator based on the angular rate detected by the angular rate sensor, wherein
the posture control actuator unit is supported by the vehicle body frame in such a manner as to be attachable to and detachable from the vehicle body frame, the posture control actuator controller, the posture control actuator and the angular rate sensor being incorporated in such a manner as not to be displaceable relative to one another.

(3) A leaning vehicle comprising:
a vehicle body frame that is configured to lean in a leaning-vehicle-leftward direction when the leaning vehicle is turning left and to lean in a leaning-vehicle-rightward direction when the leaning vehicle is turning right;
at least one steerable wheel supported by the vehicle frame body;
a steering mechanism configured to steer the at least one steerable wheel in accordance with a rider's manipulation; and
the posture control actuator unit according to (1) or (2).

The leaning vehicle of (3) comprises the posture control actuator unit of (1) or (2), and therefore, the angular rate sensor can detect a posture change of the vehicle body frame with high accuracy.

(4) The leaning vehicle according to (3), wherein, in a vehicle-body-frame-backward view, the posture control actuator unit overlaps a center line passing a center of the vehicle body frame with respect to a vehicle-body-frame-left-right direction and extending along a vehicle-body-frame-up-down direction.

(5) The leaning vehicle according to (3) or (4), wherein the angular rate sensor is a roll rate sensor configured to detect a roll rate that is an amount of change per unit time of a rotation angle of the vehicle body frame around a roll axis, the rotation angle changing as the vehicle body frame is rotating around the roll axis.

The roll rate sensor of the leaning vehicle of (5) can detect a change of the roll angle accurately.

(6) The leaning vehicle according to (5), wherein:
the steering mechanism includes a handlebar to be manipulated by the rider, and a steering shaft supported by the vehicle body frame in such a manner as to be rotatable on its axis in accordance with the rider's manipulation of the handlebar; and
the posture control actuator is configured to output posture control power to cause the steering shaft to rotate on its axis.

(7) The leaning vehicle according to (5), wherein:
the at least one steerable wheel includes a left steerable wheel that is positioned farther in a vehicle-body-frame-leftward direction than a center of the vehicle body frame with respect to a vehicle-body-frame-left-right direction and is rotatable around a left front axle, and a right steerable wheel that is positioned farther in a vehicle-body-frame-rightward direction than the center of the vehicle frame with respect to the vehicle-body-frame-left-right direction and is rotatable around a right front axle;
the leaning vehicle further comprises a link mechanism including a plurality of link members that are displaceable relative to the vehicle body frame and supporting the left steerable wheel and the right steerable wheel, the link mechanism being configured to cause the leaning vehicle to lean in the vehicle-body-frame-leftward direction when the leaning vehicle is turning left by displacing the vehicle body frame and the plurality of link members relative to one another such that the left steerable axle is positioned farther in a vehicle-body-frame-upward direction than the right steerable axle, and to cause the leaning vehicle to lean in the vehicle-body-frame-rightward direction when the leaning vehicle is turning right by displacing the vehicle body frame and the plurality of link members relative to one another such that the right steerable axle is positioned farther in the vehicle-body-frame-upward direction than the left steerable axle; and
the posture control actuator is configured to output posture control power to displace the vehicle body frame and the plurality of link members relative to one another.

In the leaning vehicle of (7), the posture control actuator controller controls the operation of the link mechanism, based on the roll rate of the vehicle body frame accurately detected by the roll rate sensor. When the link mechanism operates, the vehicle body frame rotates around the roll axis. Therefore, the posture control actuator controller of the leaning vehicle of (7) can control the posture of the vehicle body frame with high accuracy.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes one of the associated items in a list and all possible combinations of the associated items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meaning as commonly understood by one of ordinary skill in the art to which the present teaching pertains.

It should be understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effects of Invention

The present teaching permits highly accurate detection of a posture change of a vehicle body frame by use of an angular rate sensor.

BRIEF DESCRIPTION OF DRAWINGS

FIG. 1B is a looking-to-the-right (R) view of a leaning vehicle 1a.

FIG. 2 is a looking-to-the-back (B) view of the leaning vehicle 1a.

FIG. 3 is a looking-to-the-down (D) view of the leaning vehicle 1a.

FIG. 4 is a looking-to-the-back (B) view of the leaning vehicle 1a.

FIG. 9 is a looking-to-the-down (d) view of the front part of the leaning vehicle 1b when its vehicle body frame 1021 is upright.

FIG. 13 is a flowchart showing operations carried out by the posture control actuator controller 1606.

DESCRIPTION OF EMBODIMENTS (Outline)

Figure 1A:
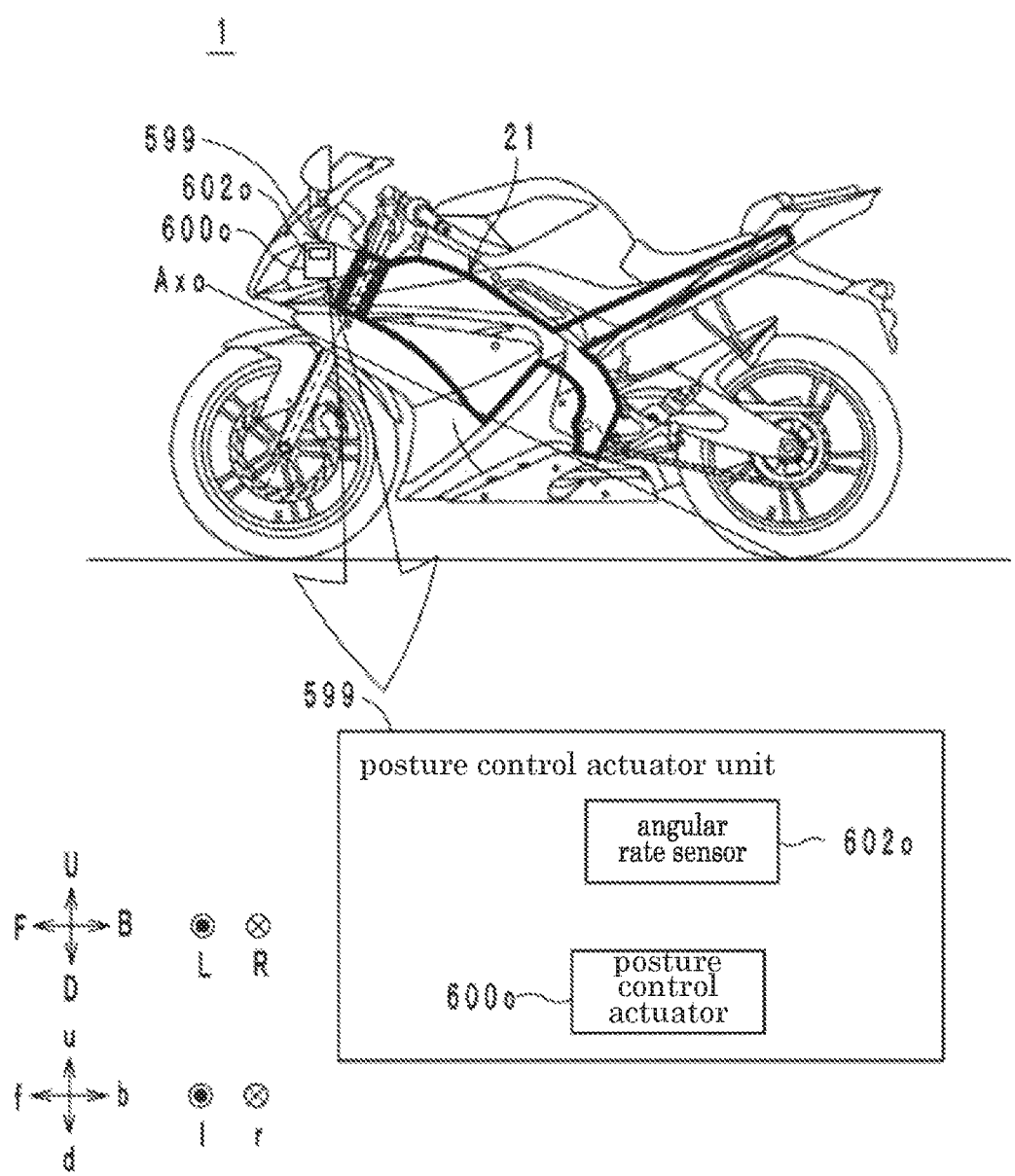
FIG. 1A is a looking-to-the-right (R) view of a leaning vehicle 1.

The overall structure of a leaning vehicle 1 according to the gist of the present teaching will hereinafter be described with reference to the drawings. A two-wheeled leaning vehicle (which will hereinafter be referred to simply as a leaning vehicle) including a vehicle body frame 21 capable of leaning, a front wheel, and a rear wheel will hereinafter be described as an example of the leaning vehicle 1. FIG. 1 is a looking-to-the-right (R) view of the leaning vehicle 1.

A posture control actuator unit (posture control actuator device) 599 is used for the leaning vehicle 1 wherein the vehicle body frame 21 leans leftward when the leaning vehicle 1 is turning left and leans rightward when the leaning vehicle 1 is turning right.

The posture control actuator unit 599 includes a posture control actuator 600o and an angular rate sensor 602o. The posture control actuator 600o is configured to output posture control power to control the posture of the vehicle body frame 21. The posture control actuator 600o is, for example, an EPS actuator, an EPL actuator, or the like.

As the vehicle body frame 21 is rotating around a rotation axis Axo, the rotation angle of the vehicle body frame 21 around the rotation axis Axo changes, and the angular rate sensor 602o is configured to detect the angular rate that is the amount of change per unit time of the rotation angle. The rotation axis Axo is, for example, a roll axis, a pitch axis, a yaw axis, or the like. In the example shown in FIG. 1, the angular rate is, for example, a roll rate, a pitch rate, a yaw rate, or the like.

The posture control actuator unit 599 is supported by the vehicle body frame 21 in such a manner as to be attachable to and detachable from the vehicle body frame 21, and the posture control actuator 600o and the angular rate sensor 602o are incorporated in such a manner as not to be displaceable relative to each other. The statement that "the posture control actuator unit 599 is supported by the vehicle body frame 21 in such a manner as to be attachable to and detachable from the vehicle body frame 21" means, for example, that the posture control actuator unit 599 is fastened to the vehicle body frame 21 via a fastener member such as a screw, a combination of a bolt and a nut, or the like. The statement that "the posture control actuator unit 599 is supported by the vehicle body frame 21 in such a manner as to be attachable to and detachable from the vehicle body frame 21" does not include, for example, that the posture control actuator unit 599 is bonded to the vehicle body frame 21 only via an adhesive. However, the statement that "the posture control actuator unit 599 is supported by the vehicle body frame 21 in such a manner as to be attachable to and detachable from the vehicle body frame 21", includes, for example, that the posture control actuator unit 599 is fastened to the vehicle body frame 21 mainly via a fastener member such as a screw, a combination of a bolt and a nut, or the like, and subsidiarily via an adhesive. The statement that the posture control actuator 600o and the angular rate sensor 602o are not displaceable relative to each other means that the relative positional relationship between the posture control actuator 600o and the angular rate sensor 602o is not variable. In this specification, when it is stated that a first member and a second member are not displaceable relative to each other, it also means that there is no elastic member for impact absorption, such as a rubber mount or the like, in the power transmission route between the first member and the second member.

The angular rate sensor 602o of the posture control actuator unit 599 can detect a posture change of the vehicle body frame 21 with high accuracy. More specifically, the posture control actuator 600o outputs posture control power to control the posture of the vehicle body frame 21. For the purpose, the posture control actuator unit 599 is supported by the vehicle body frame 21 in such a manner as to be attachable to and detachable from the vehicle body frame 21. This inhibits a delay of a posture change of the posture control actuator 600o from a posture change of the vehicle body frame 21. The posture control actuator 600o and the angular rate sensor 602o are incorporated in such a manner as not to be displaceable relative to each other. This inhibits a delay of a posture change of the angular rate sensor 602o from a posture change of the vehicle body frame 21. Accordingly, the angular rate sensor 602o of the posture control actuator unit 599 can detect a posture change of the vehicle body frame 21 with high accuracy.

The angular rate sensor 602o of the posture control actuator unit 599 can detect a posture change of the vehicle body frame 21 with high accuracy. More specifically, the posture control actuator 600o outputs posture control power to control the posture of the vehicle body frame 21. For the purpose, the posture control actuator 600o is designed to be positioned at a predetermined angle to the roll axis or the like that is associated with the posture change of the vehicle body frame 21. For example, when the posture control actuator 600o is an EPS actuator, the posture control actuator 600o may be positioned such that the rotation axis of the posture control actuator 600o is parallel to a steering shaft. For example, when the posture control actuator 600o is an EPL actuator, the posture control actuator 600o may be positioned such that the rotation axis of the posture control actuator 600*o* is parallel to a rotation axis of the vehicle body frame 21. Thus, the posture control actuator 600*o* is attached to the vehicle body frame 21 with high positional accuracy. Then, the posture control actuator 600*o* and the angular rate sensor 602*o* are incorporated in such a manner as not to be displaceable relative to each other. Accordingly, the angular rate sensor 602*o* is also mounted at a sensor mounting position of the vehicle body frame 21 with high positional accuracy. Therefore, the angular rate sensor 600*o* of the posture control actuator unit 599 can detect a posture change of the vehicle body frame 21 with high accuracy.

The posture control actuator 600*o* of the posture control actuator unit 599 is attached to the vehicle body frame 21 with high positional accuracy. Therefore, it is easy to make the axis for the angular rate detection carried out by the angular rate sensor 602*o* almost parallel to the rotation axis Axo of the vehicle body frame 21. Accordingly, the angular rate sensor 602*o* can detect the angular rate of the vehicle body frame 21 with high accuracy. Also, even when the axis for the angular rate detection carried out by the angular rate sensor 602*o* is not parallel to the rotation axis Axo of the vehicle body frame 21, the angle formed between the axis for the angular rate detection carried out by the angular rate sensor 602*o* and the rotation axis Axo of the vehicle body frame 21 is easily identified. Then, it is easy to make a correction to the angular rate detected by the angular rate sensor 602*o*.

Also, the posture control actuator unit 599 can be downsized. More specifically, in the posture control actuator unit 599, the posture control actuator 600*o* and the angular rate sensor 602*o* are incorporated in such a manner as not to be displaceable relative to each other. Therefore, it is not necessary to provide a mount for attachment of the angular rate sensor 602*o* to the vehicle body frame 21. Accordingly, the number of components of the posture control actuator unit 599 is reduced, and the posture control actuator unit 599 is downsized.

First Embodiment

[Overall Structure]

Figure 1B:
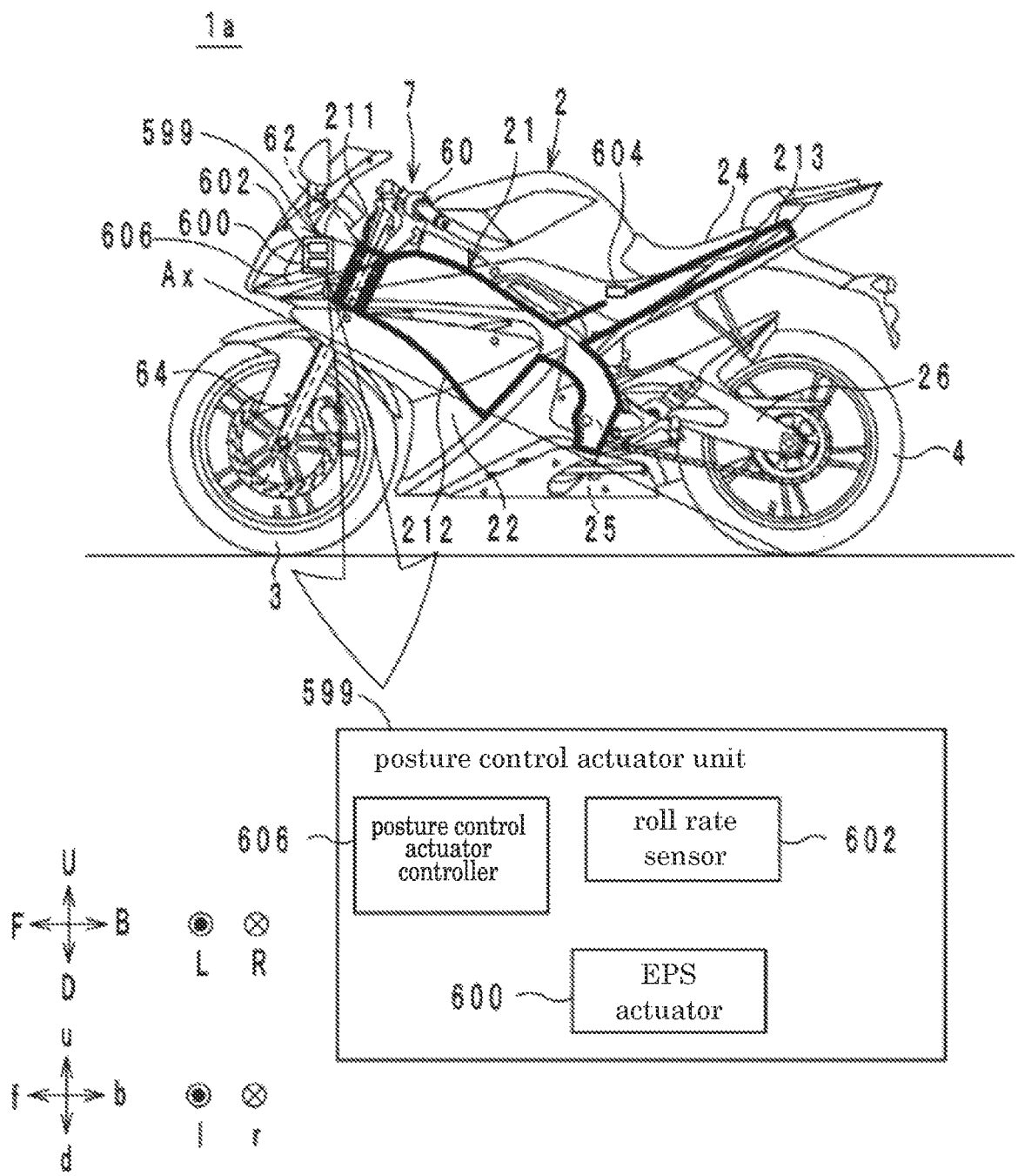
Figure 2:
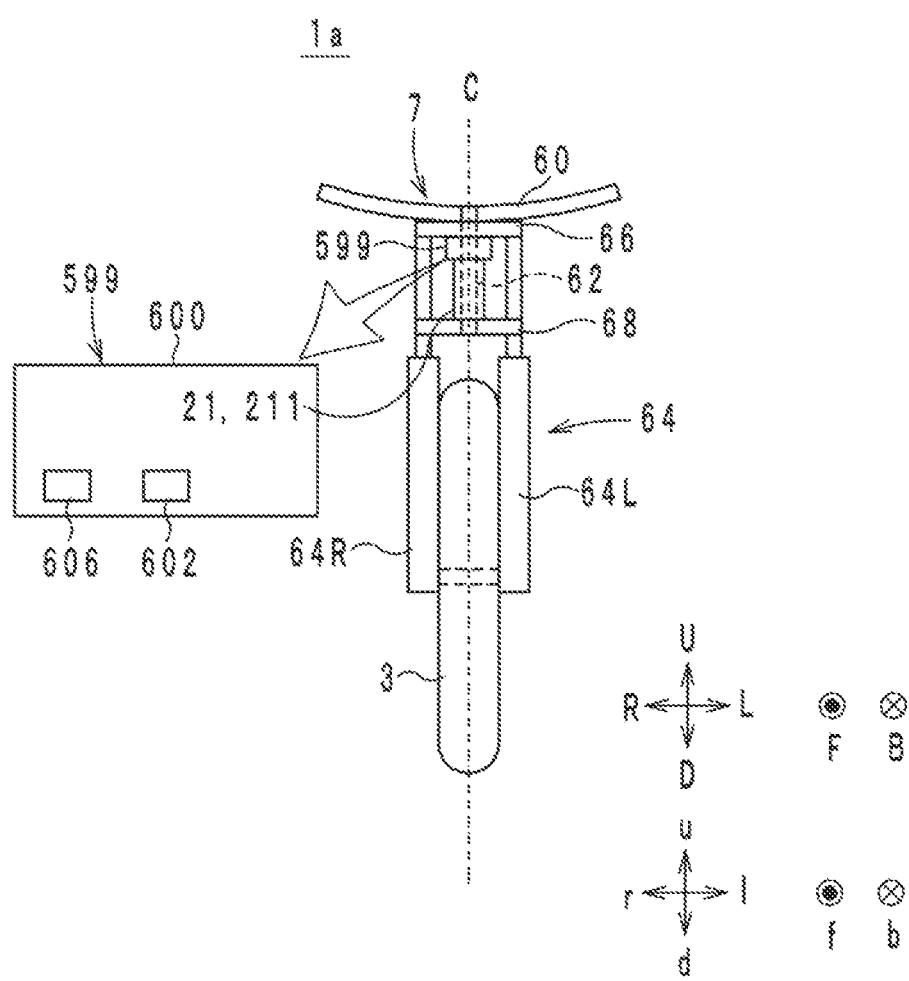

The overall structure of a leaning vehicle 1*a* according to a first embodiment will hereinafter be described with reference to the drawings. In the present embodiment, as an example of a leaning vehicle, a two-wheeled leaning vehicle (which will hereinafter be referred to simply as a leaning vehicle) including a vehicle body frame capable of leaning, a front wheel, and a rear wheel is described. FIG. 1B is a looking-to-the-right (R) view of the leaning vehicle 1*a*. FIG. 2 is a schematic looking-to-the-back (B) view of the leaning vehicle 1*a*. In FIG. 2, the leaning vehicle 1*a* is in an upright posture. Since FIG. 2 is a schematic view, there are some inconsistencies in size, etc. between FIG. 1B and FIG. 2. FIG. 2 shows only principal parts, and a vehicle body cover 22 is omitted in FIG. 2.

In the following paragraphs, a forward direction in a front-back direction of the leaning vehicle 1*a* is referred to as a forward direction F (leaning-vehicle-forward direction). A backward direction in the front-back direction of the leaning vehicle 1*a* is referred to as a backward direction B (leaning-vehicle-backward direction). A leftward direction in a left-right direction of the leaning vehicle 1*a* is referred to as a leftward direction L (leaning-vehicle-leftward direction). A rightward direction in the left-right direction of the leaning vehicle 1*a* is referred to as a rightward direction R (leaning-vehicle-rightward direction). An upward direction in an up-down direction of the leaning vehicle 1*a* is referred to as an upward direction U (leaning-vehicle-upward direction). A downward direction in an up-down direction of the leaning vehicle 1*a* is referred to as a downward direction D (leaning-vehicle-downward direction). The front-back direction of the leaning vehicle 1*a* is referred to as a front-back direction FB (leaning-vehicle-front-back direction). The left-right direction of the leaning vehicle 1*a* is referred to as a left-right direction LR (leaning-vehicle-left-right direction). The up-down direction of the leaning vehicle 1*a* is referred to as an up-down direction UD (leaning-vehicle-up-down direction). The forward direction in the front-back direction of the leaning vehicle 1*a* is a forward direction relative to a rider straddling the leaning vehicle 1*a*. The backward direction in the front-back direction of the leaning vehicle 1*a* is a backward direction relative to a rider straddling the leaning vehicle 1*a*. The leftward direction in the left-right direction of the leaning vehicle 1*a* is a leftward direction relative to a rider straddling the leaning vehicle 1*a*. The rightward direction in the left-right direction of the leaning vehicle 1*a* is a rightward direction relative to a rider straddling the leaning vehicle 1*a*. The upward direction in the up-down direction of the leaning vehicle 1*a* is an upward direction relative to a rider straddling the leaning vehicle 1*a*. The downward direction in the up-down direction of the leaning vehicle 1*a* is a downward direction relative to a rider straddling the leaning vehicle 1*a*.

The vehicle body frame 21 of the leaning vehicle 1*a* is capable of leaning in the leftward direction L and the rightward direction R. When the vehicle body frame 21 leans in the leftward direction L or the rightward direction R, the up-down direction and the left-right direction of the vehicle body frame 21 do not respectively coincide with the up-down direction UD and the left-right direction LR of the leaning vehicle 1*a*. On the other hand, when the vehicle body frame 21 is in an upright posture, the up-down direction and the left-right direction of the vehicle body frame 21 coincide with the up-down direction UD and the left-right direction LR, respectively, of the leaning vehicle 1*a*. In the following paragraphs, a forward direction along the front-back direction of the vehicle body frame 21 is referred to as a forward direction f (vehicle-body-frame-forward direction). A backward direction along the front-back direction of the vehicle body frame 21 is referred to as a backward direction b (vehicle-body-frame-backward direction). A leftward direction along the left-right direction of the vehicle body frame 21 is referred to as a leftward direction l (vehicle-body-frame-leftward direction). A rightward direction along the left-right direction of the vehicle body frame 21 is referred to as a rightward direction r (vehicle-body-frame-rightward direction). An upward direction along the up-down direction of the vehicle body frame 21 is referred to as an upward direction u (vehicle-body-frame-upward direction). A downward direction along the up-down direction of the vehicle body frame 21 is referred to as a downward direction d (vehicle-body-frame-downward direction). The front-back direction of the vehicle body frame 21 is referred to as a front-back direction fb (vehicle-body-frame-front-back direction). The left-right direction of the vehicle body frame 21 is referred to as a left-right direction lr (vehicle-body-frame-left-right direction). The up-down direction of the vehicle body frame 21 is referred to as an up-down direction ud (vehicle-body-frame-up-down direction).

In the present specification, a shaft or a member that extends along the front-back direction does not necessarily mean a shaft or a member that extends in parallel to the front-back direction. A shaft or a member that extends along the front-back direction includes a shaft or a member that is inclined from the front-back direction at an angle within ±45 degrees. In a similar way, a shaft or a member that extends along the up-down direction includes a shaft or a member that is inclined from the up-down direction at an angle within ±45 degrees. A shaft or a member that extends along the left-right direction includes a shaft or a member that is inclined from the left-right direction at an angle within ±45 degrees. The upright posture of the vehicle body frame 21 means a state wherein nobody is riding the leaning vehicle 1a, the leaning vehicle 1a is out of fuel, and the front wheel is neither steered nor caused to lean.

In the present specification, a statement that a first member is supported by a second member includes a case in which the first member is attached to the second member such that the first member is immovable (that is, fixed in a place) relative to the second member and a case in which the first member is attached to the second member such that the first member is movable relative to the second member. The statement that the first member is supported by the second member also includes a case in which the first member is directly attached to the second member and a case in which the first member is attached to the second member via a third member.

In the present specification, a statement that the first member and the second member are arranged in the front-back direction means the following situation. When the first member and the second member are viewed from a direction perpendicular to the front-back direction, both the first member and the second member are on an arbitrary line representing the front-back direction. In the present specification, a statement that the first member and the second member are arranged in the front-back direction when viewed along the up-down direction means the following situation. When the first member and the second member are viewed along the up-down direction, both the first member and the second member are on an arbitrary line representing the front-back direction. In this case, when the first member and the second member are viewed along the left-right direction, which is different from the up-down direction, not both the first member and the second member are necessarily on the arbitrary line representing the front-back direction. Further, the first member and the second member may be in contact with each other. The first member and the second member may be out of contact with each other. A third member may be positioned between the first member and the second member. Such definitions apply to other directions as well as the front-back direction.

In the present specification, a statement that the first member is positioned farther in the forward direction than the second member means the following situation. The first member is positioned farther in the forward direction than a plane that passes a front edge of the second member and is perpendicular to the front-back direction. The first member and the second member may or may not be arranged in the front-back direction. This definition applies to other directions as well as the front-back direction.

In the present specification, the statement that the first member is positioned in front of the second member means the following situation. At least a part of the first member is positioned in a range that the second member passes during a translation thereof in the forward direction. Accordingly, the first member may be positioned within the range that the second member passes during a translation thereof in the forward direction, or may protrude from the range that the second member passes during a translation thereof in the forward direction. In this case, the first member and the second member are arranged in the front-back direction. This definition applies to other directions as well as the front-back direction.

In the present specification, a statement that the first member is positioned in front of the second member in a view along the left-right direction means the following situation. The first member and the second member are arranged in the front-back direction in a view along the left-right direction, and the part of the first member facing the second member is positioned farther in the forward direction than the second member in a view along the left-right direction. According to this definition, three-dimensionally, the first member and the second member are not necessarily arranged in the front-back direction. This definition applies to other directions as well as the front-back direction.

In the present specification, unless otherwise noted, parts of the first member are defined as follows. A front part of the first member means the front half of the first member. A rear part of the first member means the rear half of the first member. A left part of the first member means the left half of the first member. A right part of the first member means the right half of the first member. An upper part of the first member means the upper half of the first member. A lower part of the first member means the lower half of the first member. An upper edge of the first member means the edge of the first member in the upward direction. A lower edge of the first member means the edge of the first member in the downward direction. A front edge of the first member means the edge of the first member in the forward direction. A rear edge of the first member means the edge of the first member in the backward direction. A right edge of the first member means the edge of the first member in the rightward direction. A left edge of the first member means the edge of the first member in the leftward direction. An upper end part of the first member means the upper edge and its vicinity of the first member. A lower end part of the first member means the lower edge and its vicinity of the first member. A front end part of the first member means the front edge and its vicinity of the first member. A rear end part of the first member means the rear edge and its vicinity of the first member. A right end part of the first member means the right edge and its vicinity of the first member. A left end part of the first member means the left edge and its vicinity of the first member. The first member is a component of the leaning vehicle 1a.

As shown in FIG. 1B, the leaning vehicle 1a includes a vehicle body 2, a front wheel 3, a rear wheel 4, and a steering mechanism 7. The vehicle body 2 includes a vehicle body frame 21, a vehicle body cover 22, a seat 24, a power unit 25, and a swing arm 26.

The vehicle body frame 21 leans in the leftward direction L when the leaning vehicle 1a is turning left. The vehicle body frame 21 leans in the rightward direction R when the leaning vehicle 1a is turning right. In FIG. 1B, the vehicle body frame 21 is indicated by bold lines. However, the vehicle body frame 21 is covered by the vehicle body cover 22, and therefore, under ordinary conditions, the vehicle body frame 21 cannot be seen in FIG. 1B.

The vehicle body frame 21 includes a head pipe 211, a main frame 212, and a seat rail 213. The head pipe 211 is positioned in the front part of the leaning vehicle 1a. The front part of the leaning vehicle 1a is a part thereof that is farther in the forward direction f than the front edge of the seat 24. The rear part of the leaning vehicle 1a is a part thereof that is farther in the backward direction b than the front edge of the seat 24. In a view in the leftward direction l or the rightward direction r, the head pipe 211 is inclined from the up-down direction ud such that the upper end part of the head pipe 211 is positioned farther in the backward direction b than the lower end part of the head pipe 211.

In a view in the rightward direction r, the main frame 212 is positioned farther in the backward direction b than the head pipe 211. The seat rail 213 linearly extends from the main frame 212 to a backward and upward direction b, u.

In a view in the rightward direction r, the swing arm 26 extends from the lower and rear part of the main frame 212 to the backward direction b. The swing arm 26 is supported by the main frame 212 in such a manner as to be capable of turning on the front end part of the swing arm 26. Thereby, the rear end part of the swing arm 26 is movable up and down.

The vehicle body cover 22 covers the vehicle body frame 21. The vehicle body cover 22 also covers some part of the power unit 25.

The seat 24 is to be sat on by a rider. The seat 24 is supported by the seat rail 213. The power unit 25 includes a power source, such as an engine, an electric motor or the like, and a power transmission system, such as a transmission device or the like. The power unit 25 is supported by the main frame 212.

The steering mechanism 7 is arranged around the head pipe 211. The steering mechanism 7 is configured to steer the front wheel 3 in accordance with the rider's manipulation. As shown in FIG. 2, the steering mechanism 7 includes a handlebar 60, a steering shaft 62, a front fork 64, an upper bracket 66, and an under bracket 68. The handlebar 60 is to be manipulated by the rider. The steering shaft 62 is supported by the vehicle body frame 21 in such a manner as to be rotatable on its central axis in accordance with the rider's manipulation of the handlebar 60. More specifically, the upper bracket 66 and the under bracket 68 are, as shown in FIG. 2, plate-like members extending along the left-right direction lr. The upper bracket 66 is positioned farther in the upward direction u than the head pipe 211. The under bracket 68 is positioned farther in the downward direction d than the head pipe 211. The steering shaft 62 is inserted in the head pipe 211 and thereby supported by the head pipe 211 in such a manner as to be rotatable. Further, the steering shaft 62 is fixed to the upper bracket 66 and the under bracket 68. The handlebar 60 is fixed to the upper bracket 66.

The front fork 64 is fixed to the upper bracket 66 and the under bracket 68. Specifically, as shown in FIG. 2, the front fork 64 includes a left shock absorber 64L and a right shock absorber 64R. The left shock absorber 64L extends from the upper bracket 66 and the under bracket 68 to the downward direction d. The left shock absorber 64L is positioned farther in the leftward direction l than the center of the vehicle body frame 21 in an upright posture with respect to the left-right direction lr. The right shock absorber 64R extends from the upper bracket 66 and the under bracket 68 in the downward direction d. The right shock absorber 64R is positioned farther in the rightward direction r than the center of the vehicle body frame 21 in an upright posture with respect to the left-right direction lr. Accordingly, when the rider turns the handlebar 60, the steering shaft 62, the front fork 64, the upper bracket 66 and the under bracket 68 rotate around the central axis of the steering shaft 62 in a body.

The left shock absorber 64L and the right shock absorber 64R are what are called telescopic shock absorbers. The left shock absorber 64L and the right shock absorber 64R each, for example, include a combination of a damper and a spring. The left shock absorber 64L and the right shock absorber 64R expand and contract along the up-down direction ud and thereby absorb displacements of the front wheel 3 along the up-down direction ud.

The front wheel 3 is a steerable wheel of the leaning vehicle 1a. The front wheel 3 is positioned in the front part of the leaning vehicle 1a. The front wheel 3 is supported by the lower end part of the front fork 64 in such a manner as to be rotatable around an axle. Thus, the front wheel 3 is supported by the vehicle body frame 21 via the steering mechanism 7. Accordingly, the rider can steer the front wheel 3 by manipulating the handlebar 60.

The rear wheel 4 is a driving wheel of the leaning vehicle 1a. The rear wheel 4 is rotated by a driving force generated by the power unit 25. The rear wheel 4 is positioned in the rear part of the leaning vehicle 1a. The rear wheel 4 is supported by the lower end part of the swing arm 26 in such a manner as to be rotatable around an axle.

[Steering Motion]

Figure 3:
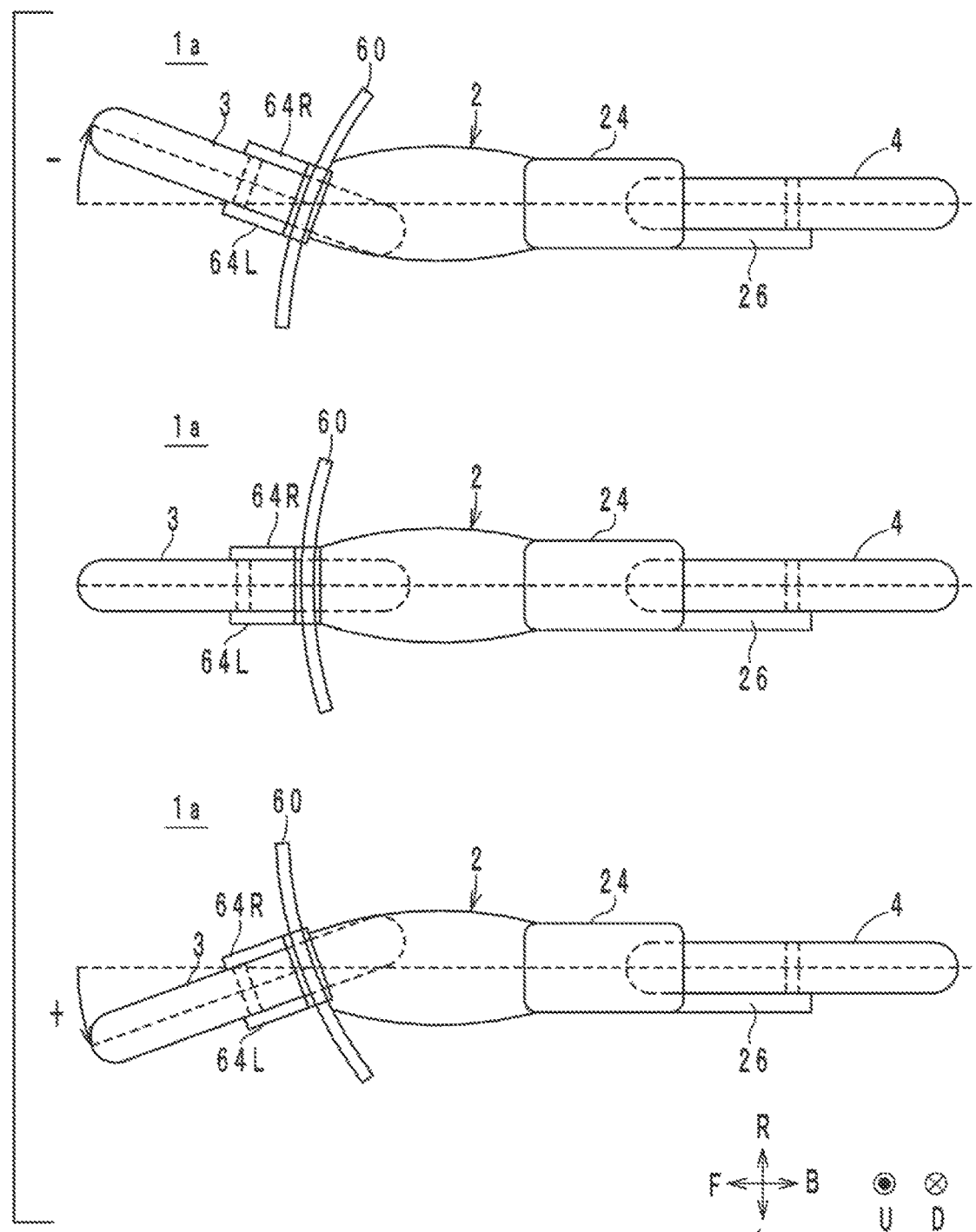

Next, steering motions of the leaning vehicle 1a are described with reference to the drawings. FIG. 3 is a schematic looking-to-the-down (D) view of the leaning vehicle 1a. FIG. 3 shows a state wherein the front wheel 3 is steered in the leftward direction L, a state wherein the front wheel 3 is not steered, and a state wherein the front wheel 3 is steered in the rightward direction R. As indicated in FIG. 3, the direction in which the handlebar 60 is turned counterclockwise in a view in the downward direction d is defined as a positive direction. The direction in which the handlebar 60 is turned clockwise in a view in the downward direction d is defined as a negative direction.

As shown in FIG. 3, in a view in the downward direction D, the front wheel 3 is turned counterclockwise when the rider turns the handlebar 60 counterclockwise (in the positive direction). Then, the front wheel 3 is steered in the leftward direction L (steered leftward).

As shown in FIG. 3, in a view in the downward direction D, the front wheel 3 is turned clockwise when the rider turns the handlebar 60 clockwise (in the negative direction). Then, the front wheel 3 is steered in the rightward direction R (steered rightward).

[Leaning Motion]

Next, leaning motions of the leaning vehicle 1a are described with reference to the drawings. FIG. 4 is a schematic looking-to-the-back (B) view of the leaning vehicle 1a. FIG. 4 shows a state wherein the vehicle body frame 21 leans in the leftward direction L and a state wherein the vehicle body frame 21 leans in the rightward direction R. FIG. 4 shows that the front wheel 3 is steered leftward by self-steering when the vehicle body frame 21 leans in the leftward direction L. FIG. 4 shows that the front wheel 3 is steered rightward by self-steering when the vehicle body frame 21 leans in the rightward direction R.

The vehicle body frame 21 leans in the leftward direction L or the rightward direction R by rotating around a roll axis Ax. The roll axis Ax is an axis extending along the front-back direction FB. More specifically, as shown in FIG. 1B, the roll axis Ax is a straight line that passes the contact point between the rear wheel 4 and the ground and is perpendicular to the steering shaft 62 when the vehicle body frame 21 is in an upright posture. In a view in the backward direction d, the roll axis Ax is in the center of the vehicle body frame 21 in an upright posture with respect to the left-right direction lr.

As the vehicle body frame 21 is rotating around the roll axis Ax, the rotation angle of the vehicle body frame 21 around the roll axis Ax changes, and the rotation angle of the vehicle body frame 21 around the roll axis Ax is referred to as a roll angle θ. In the following paragraphs, as shown in FIG. 2, the straight line that passes the center of the vehicle body frame 21 in an upright posture with respect to the left-right direction lr and extends along the up-down direction ud is defined as a center line C. As shown in FIG. 4, when the vehicle body frame 21 leans in the leftward direction L or the rightward direction R, the center line C leans in the leftward direction L or the rightward direction R together with the vehicle body frame 21. The roll angle θ is an angle formed between the vertical axis and the center line C. The vertical axis is an axis parallel to the up-down direction UD.

Further, as shown in FIG. 4, when the vehicle body frame 21 leans in the leftward direction L, the direction of the lean is referred to as a positive direction of the roll angle θ. In other words, the clockwise direction around the roll axis Ax in a view in the backward direction B is defined as a positive direction of the roll angle θ. When the vehicle body frame 21 leans in the rightward direction R, the direction of the lean is referred to as a negative direction of the roll angle θ. In other words, the counterclockwise direction around the roll axis Ax in a view in the backward direction B is defined as a negative direction of the roll angle θ. The roll angle θ changes within a range of −90° to 90°.

As shown in FIG. 4, in a view in the backward direction B, the vehicle body frame 21 rotates clockwise around the roll axis Ax and leans in the leftward direction L. In this case, the roll angle θ is a positive value. Also, the front wheel 3 is steered leftward by self-steering. Then, the leaning vehicle 1a turns in the leftward direction L.

As shown in FIG. 4, in a view in the backward direction B, the vehicle body frame 21 rotates counterclockwise around the roll axis Ax and leans in the rightward direction R. Also, the front wheel 3 is steered rightward by self-steering. In this case, the roll angle θ is a negative value. The leaning vehicle 1a turns in the rightward direction R.

[Posture Control Actuator Controller]

Figure 5:
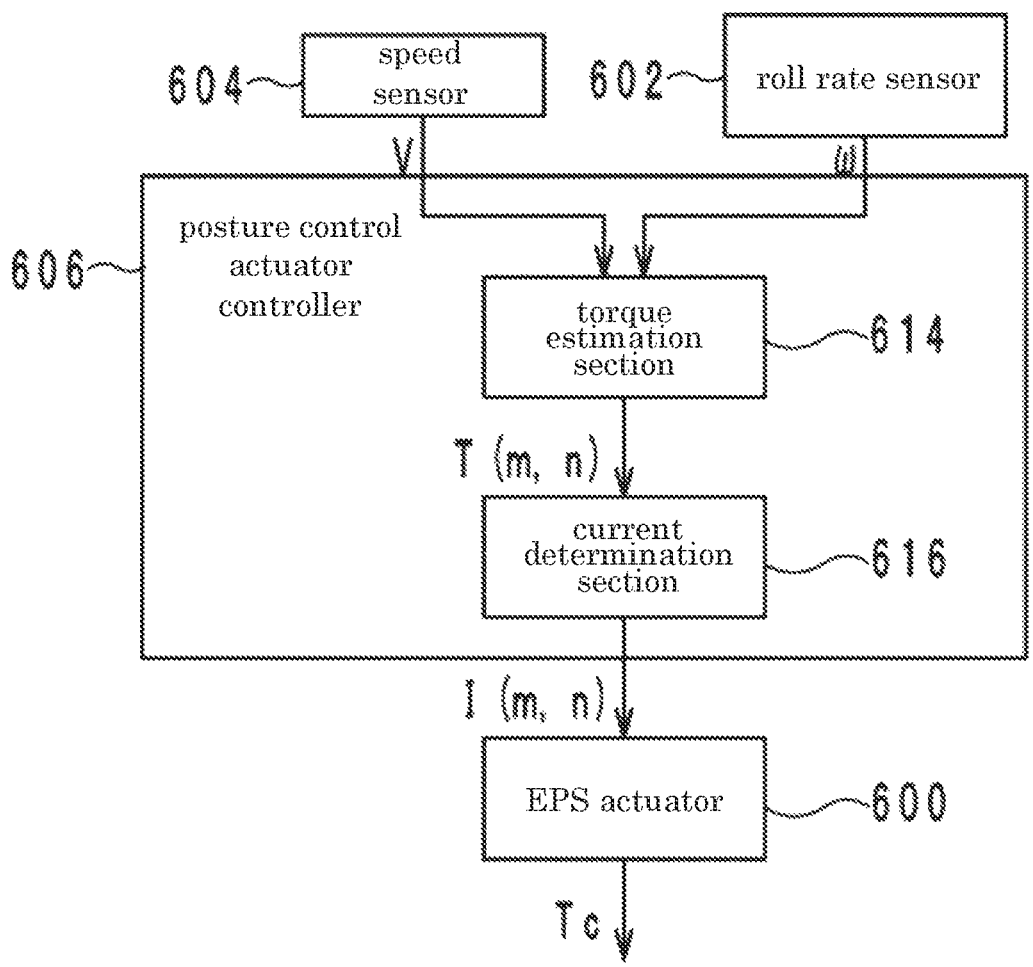
FIG. 5 is a block diagram of a posture control actuator controller 606.

Next, the posture control actuator controller 606 of the leaning vehicle 1a is described with reference to the drawings. FIG. 5 is a block diagram of the posture control actuator controller 606.

First, a steering torque T is described. The steering torque T is a torque that is generated by the rider's manipulation of the handlebar 60 and acts on the steering shaft 62. More specifically, the steering torque T is a torque that is generated and inputted to the steering shaft 62 by the rider's manipulation of the handlebar 60 when the roll angle θ of the vehicle body frame 21 of the leaning vehicle 1a running at a speed V is changing at a roll rate ω. The steering torque T acts around the rotation axis of the handlebar 60 (central axis of the steering shaft 62). When the steering torque T causes a counterclockwise rotation of the steering shaft 62 in a view in the downward direction d, the direction of the torque is defined as a positive direction of the steering torque T. When the steering torque T causes a clockwise rotation of the steering shaft 62 in a view in the downward direction d, the direction of the torque is defined as a negative direction of the steering torque T.

As shown in FIG. 1B, the leaning vehicle 1a further includes a posture control actuator unit 599 and a speed sensor 604.

The posture control actuator unit 599 includes an EPS (electric power steering) actuator 600 and a roll rate sensor 602 as well as the posture control actuator controller 606. The EPS actuator 600 (an example of a posture control actuator) is supplied with electric power and outputs a posture control torque Tc (an example of posture control power) to cause the steering shaft 62 to rotate on its central axis. The posture control torque Tc is a torque to control the posture of the vehicle body frame 21. More specifically, as shown in FIG. 2, the EPS actuator 600 is fixed in the upper end part of the head pipe 211. The EPS actuator 600 is a combination of an electric motor and a gear. The electric motor generates a torque. The torque generated by the electric motor is outputted to the steering shaft 62 as a posture control torque Tc via the gear.

The roll rate sensor 602 detects the roll rate ω that is the amount of change per unit time of the roll angle θ. When the vehicle body frame 21 leans in the leftward direction L, the direction of the lean is referred to as a positive direction of the roll rate ω. In other words, the clockwise direction around the roll axis Ax in a view in the backward direction B is defined as a positive direction of the roll rate ω. When the vehicle body frame 21 leans in the rightward direction R, the direction of the lean is referred to as a negative direction of the roll rate ω. In other words, the counterclockwise direction around the roll axis Ax in a view in the backward direction B is defined as a negative direction of the roll rate ω.

The speed sensor 604 detects the speed V of the leaning vehicle 1a. The speed V is a positive value when the leaning vehicle 1a is running forward.

The posture control actuator controller 606 controls the EPS actuator 600 based on the roll rate ω detected by the roll rate sensor 602. The posture control actuator controller 606 is, for example, an IC (integrated circuit) for control of the EPS actuator 600. However, the posture control actuator controller 606 does not need to be achieved by a single IC, and the posture control actuator controller 606 may be a combination of one or more ICs, one or more electronic components and/or one or more circuit boards.

In the posture control actuator unit 599, the EPS actuator 600, the roll rate sensor 602 and the posture control actuator controller 606 are incorporated in such a manner as not to be displaceable relative to one another, and the posture control actuator unit 599 is supported by the vehicle body frame 21 in such a manner as to be attachable to and detachable from the vehicle body frame 21. More specifically, for example, the roll rate sensor 602 and the posture control actuator controller 606 are fixed in a case of the EPS actuator 600 as shown in FIG. 2. The means for fixing the roll rate sensor 602 and the posture control actuator controller 606 to the EPS actuator 600 may be a combination of a bolt and a nut, a screw, a snap-fit, an adhesive, an adhesive tape, welding, brazing, etc. The EPS actuator 600 is to output a posture control torque Tc to the steering shaft 62. Therefore, the EPS actuator 600 is supported by the vehicle body frame 21 in such a manner as not to be displaceable relative to the vehicle body frame 21. In this structure, the roll rate sensor 602 and the posture control actuator controller 606 are not displaceable relative to the EPS actuator 600, and the EPS actuator 600 is not displaceable relative to the vehicle body frame 21. In the present specification, when it is stated that a first member is supported by a second member in such a manner as not to be displaceable relative to the second member, it also means that there is no elastic member for impact absorption, such as a rubber mount or the like, between the first member and the second member.

As shown in FIG. 2, the EPS actuator 600 is fixed in the upper end part of the head pipe 211. Therefore, in a view in the backward direction d, the EPS actuator 600 overlaps the center line C. Accordingly, in a view in the backward direction d, the posture control actuator unit 599 overlaps the center line C. In the leaning vehicle 1a, in a view in the backward direction d, the roll rate sensor 602 overlaps the center line C.

The description is now returned to the posture control actuator controller 606. The posture control actuator controller 606 obtains the roll rate ω from the roll rate sensor 602. Specifically, an electric signal representing the roll rate ω (which will hereinafter be referred to simply as roll rate ω) detected by the roll rate sensor 602 is inputted to the posture control actuator controller 606.

The posture control actuator controller 606 obtains the speed V from the speed sensor 604. Specifically, an electric signal representing the speed V (which will hereinafter be referred to simply as speed V) detected by the speed sensor 606 is inputted to the posture control actuator controller 606.

The posture control actuator controller 606 does not use a torque sensor that detects the steering torque T that is generated by the rider's manipulation of the handlebar 60 and acts around the rotation axis (central axis of the steering shaft 62), and uses the roll rate sensor 602. Then, the posture control actuator controller 606 controls the EPS actuator 600 not based on the steering torque T that is generated by the rider's manipulation of the handlebar 60 and acts around the rotation axis (central axis of the steering shaft 62) but based on the roll rate ω sent from the roll rate sensor 602. In the present embodiment, the posture control actuator controller 606 uses neither a torque sensor that detects the steering torque T nor a roll sensor that detects the roll angle θ. The posture control actuator controller 606 uses the roll rate sensor 602 and the speed sensor 604. Then, the posture control actuator controller 606 controls the EPS actuator 600 based on neither the steering torque T detected by a torque sensor nor the roll angle θ detected by a roll sensor. The posture control actuator controller 606 controls the EPS actuator 600 based on the roll rate ω sent from the roll rate sensor 602 and the speed V sent from the speed sensor 604. The statement that the posture control actuator controller 606 uses neither a torque sensor nor a roll sensor means, for example, that the posture control actuator controller 606 does not use signals sent from a torque sensor and a roll sensor for control. The statement that the posture control actuator controller 606 uses the roll rate sensor 602 and the speed sensor 604 means, for example, that the posture control actuator controller 606 uses signals sent from the roll rate sensor 602 and the speed sensor 604 for control.

The posture control actuator controller 606 includes a torque estimation section 614 and a current determination section 616. The torque estimation section 614 determines an estimated steering torque value T(m, n), which is an estimated value of the steering torque T, based on the speed V and the roll rate ω. The values m and n are integers. The estimated steering torque value T(m, n) is a value of the steering torque T that is estimated to be inputted to the steering shaft 62 by the rider's manipulation of the handlebar 60 when the roll angle θ of the vehicle body frame 21 is changing at a roll rate ω while the leaning vehicle 1a is running at a speed V. The torque estimation section 614 stores an estimated torque determination table as shown by TABLE 1.

TABLE 1

| | | | | | ω(n)(deg/s) | | | | | | | |
|---|---|---|---|---|---|---|---|---|---|---|---|---|
| | | ... ω(−5) | ω(−4) | ω(−3) | ω(−2) | ω(−1) | ω(0) = 0 | ω(1) | ω(2) | ω(3) | ω(4) | ω(5) ... |
| V(m) (km/h) | V(1) | ... T(1, −5) | T(1, −4) | T(1, −3) | T(1, −2) | T(1, −1) | T(1, 0) = 0 | T(1, 1) | T(1, 2) | T(1, 3) | T(1, 4) | T(1, 5) ... |
| | V(2) | ... T(2, −5) | T(2, −4) | T(2, −3) | T(2, −2) | T(2, −1) | T(2, 0) = 0 | T(2, 1) | T(2, 2) | T(2, 3) | T(2, 4) | T(2, 5) ... |
| | V(3) | ... T(3, −5) | T(3, −4) | T(3, −3) | T(3, −2) | T(3, −1) | T(3, 0) = 0 | T(3, 1) | T(3, 2) | T(3, 3) | T(3, 4) | T(3, 5) ... |
| | V(4) | ... T(4, −5) | T(4, −4) | T(4, −3) | T(4, −2) | T(4, −1) | T(4, 0) = 0 | T(4, 1) | T(4, 2) | T(4, 3) | T(4, 4) | T(4, 5) ... |
| | V(5) | ... T(5, −5) | T(5, −4) | T(5, −3) | T(5, −2) | T(5, −1) | T(5, 0) = 0 | T(5, 1) | T(5, 2) | T(5, 3) | T(5, 4) | T(5, 5) ... |
| | ... | ... ... | ... | ... | ... | ... | ... | ... | ... | ... | ... | ... |

In the estimated torque determination table, values of the estimated steering torque T(m, n) are stored in association with values of the speed V(m) and values of the roll rate ω(n). The values of the speed V(m) are greater than 0 km/h. The greater the value m is, the greater the speed V(m) is. Accordingly, V(m)<V(m+1) holds.

When the value n is positive, the roll rate ω(n) is a positive value. In this case, the greater the value n is, the greater the roll rate ω(n) is. On the other hand, when the value n is negative, the roll rate ω(n) is a negative value. In this case, the greater the value n is, the smaller the roll rate ω(n) is (the greater the absolute value of the roll rate ω(n) is). Accordingly, ω(n)<ω(n+1) holds.

While the leaning vehicle 1a is running forward, when the rider turns the handlebar 60 clockwise (in the negative direction), the front wheel 3 is rotated at a roll rate ω(n) of a positive value. For example, while the vehicle body 21 is in an upright posture, when the rider turns the handlebar 60 clockwise (in the negative direction), the front wheel 3 is steered rightward. Then, the vehicle frame body 21 leans in the leftward direction L. On the other hand, while the leaning vehicle 1a is running forward, when the rider turns the handlebar 60 counterclockwise (in the positive direction), the front wheel 3 is rotated at a roll rate ω(n) of a negative value. For example, while the vehicle body 21 is in an upright posture, when the rider turns the handlebar 60 counterclockwise (in the positive direction), the front wheel 3 is steered leftward. Then, the vehicle body frame 21 leans in the rightward direction R. Thus, the rider performs counter-steering to generate a roll rate ω(n). Therefore, the estimated steering torque T(m, n) has the following relationship with the values m and n.

When the value n is positive (when the roll rate ω(n) is a positive value), the estimated steering torque T(m, n) is a negative value. In this case, the estimated steering torque T(m, n) indicates a steering torque to cause the steering shaft 62 to rotate clockwise (in the negative direction) in a view in the downward direction d. In this case, the greater the value n is (the greater the roll rate value ω(n) is), the smaller the estimated steering torque T(m, n) is (the greater the absolute value of the estimated steering torque T(m, n) is). Also, the greater the value m is (the greater the speed V(m) is), the smaller the estimated steering torque T(m, n) is (the greater the absolute value of the estimated steering torque T(m, n) is).

On the other hand, when the value n is negative (when the roll rate ω(n) is a negative value), the estimated steering torque T(m, n) is a positive value. In this case, the estimated steering torque T(m, n) indicates a steering torque to cause the steering shaft 62 to rotate counterclockwise (in the positive direction) in a view in the downward direction d. In this case, the smaller the value n is (the smaller the roll rate ω(n) is), the greater the estimated steering torque T(m, n) is. Also, the greater the value m is (the greater the speed V(m) is), the greater the estimated steering torque T(m, n) is.

The torque estimation section 614 identifies a speed V(m) that is closest to the speed V that the posture control actuator controller 606 has obtained. Also, the torque estimation section 614 identifies a roll rate ω(n) that is closest to the roll rate ω that the posture control actuator controller 606 has obtained. Then, the torque estimation section 614 determines an estimated steering torque T(m, n) in association with the speed value V(m) and the roll rate ω(n) with reference to TABLE 1.

The current determination section 616 controls the EPS actuator 600 based on the estimated steering torque T(m, n) determined by the torque estimation section 614. Specifically, the current determination section 616 determines a control current I(m, n) to be outputted to the EPS actuator 600, based on the estimated steering torque T(m, n). For this purpose, the current determination section 616 stores a control current determination table as shown by TABLE 2.

On the other hand, when the value n is negative, the control current I(m, n) is a positive value. The smaller the value n is, the greater the control current I(m, n) is. Also, the greater the value m is, the greater the control current I(m, n) is.

The EPS actuator 600 outputs a posture control torque Tc to the steering shaft 62 by the control current I(m, n) outputted from the current determination section 616. However, the current determination section 616 does not need to output the control current I(m, n) to the EPS actuator 600 directly. The control current I(m, n) may be supplied to the EPS actuator 600 from a power source that is provided separately from the posture control actuator controller 606.

When receiving a negative control current I(m, n), the EPS actuator 600 outputs a posture control torque Tc to rotate the steering shaft 62 clockwise (in the negative direction). In this case, the greater the absolute value of the control current I(m, n) is, the greater the absolute value of the posture control torque Tc is. Then, in a view in the backward direction B, the vehicle body frame 21 rotates clockwise (in the positive direction) around the roll axis Ax at a roll rate ω.

On the other hand, when receiving a positive control current I(m, n), the EPS actuator 600 outputs a posture

TABLE 2

| ... | T(1, −5) | T(1, −4) | T(1, −3) | T(1, −2) | T(1, −1) | T(1, 0) = 0 | T(1, 1) | T(1, 2) | T(1, 3) | T(1, 4) | T(1, 5) | ... |
| --- | --- | --- | --- | --- | --- | --- | --- | --- | --- | --- | --- | --- |
| ... | I(1, −5) | I(1, −4) | I(1, −3) | I(1, −2) | I(1, −1) | I(1, 0) = 0 | I(1, 1) | I(1, 2) | I(1, 3) | I(1, 4) | I(1, 5) | ... |
| ... | T(2, −5) | T(2, −4) | T(2, −3) | T(2, −2) | T(2, −1) | T(2, 0) = 0 | T(2, 1) | T(2, 2) | T(2, 3) | T(2, 4) | T(2, 5) | ... |
| ... | I(2, −5) | I(2, −4) | I(2, −3) | I(2, −2) | I(2, −1) | I(2, 0) = 0 | I(2, 1) | I(2, 2) | I(2, 3) | I(2, 4) | I(2, 5) | ... |
| ... | T(3, −5) | T(3, −4) | T(3, −3) | T(3, −2) | T(3, −1) | T(3, 0) = 0 | T(3, 1) | T(3, 2) | T(3, 3) | T(3, 4) | T(3, 5) | ... |
| ... | I(3, −5) | I(3, −4) | I(3, −3) | I(3, −2) | I(3, −1) | I(3, 0) = 0 | I(3, 1) | I(3, 2) | I(3, 3) | I(3, 4) | I(3, 5) | ... |
| ... | T(4, −5) | T(4, −4) | T(4, −3) | T(4, −2) | T(4, −1) | T(4, 0) = 0 | T(4, 1) | T(4, 2) | T(4, 3) | T(4, 4) | T(4, 5) | ... |
| ... | I(4, −5) | I(4, −4) | I(4, −3) | I(4, −2) | I(4, −1) | I(4, 0) = 0 | I(4, 1) | I(4, 2) | I(4, 3) | I(4, 4) | I(4, 5) | ... |
| ... | T(5, −5) | T(5, −4) | T(5, −3) | T(5, −2) | T(5, −1) | T(5, 0) = 0 | T(5, 1) | T(5, 2) | T(5, 3) | T(5, 4) | T(5, 5) | ... |
| ... | I(5, −5) | I(5, −4) | I(5, −3) | I(5, −2) | I(5, −1) | I(5, 0) = 0 | I(5, 1) | I(5, 2) | I(5, 3) | I(5, 4) | I(5, 5) | ... |
| ... | ... | ... | ... | ... | ... | ... | ... | ... | ... | ... | ... | ... |

In the control current determination table, values of the estimated steering torque T(m, n) and values of the control current I(m, n) are stored in association with each other. The control current I(m, n) is a current that the EPS actuator 600 requires to output a posture control torque Tc corresponding to the assist rate (for example, 20%) of the estimated steering torque T(m, n) to the steering shaft 62. The EPS actuator 600 outputs a posture control torque Tc corresponding to 20% of the estimated steering torque T(m, n) to the steering shaft 62. Accordingly, the rider only needs to manipulate the handlebar 60 to apply 80% of the estimated steering torque T(m, n) to the steering shaft 62. In this way, the ESP actuator 600 assists the rider's manipulation of the handlebar 60. The assist rate is an arbitrary value and may be a value other than 20%. In order to allow the rider to manipulate the handlebar 60 with less power, the assist rate should be more than 20%. In order to allow the rider to manipulate the handlebar 60 with more power, the assist rate should be less than 20%. The assist rate may be a negative value. In this case, the EPS actuator 600 outputs a posture control steering torque Tc to inhibit the rider's manipulation of the handlebar 60. Then, the EPS actuator 600 functions as a steering damper.

When the value n is positive, the control current I(m, n) is a negative value. The greater the value n is, the smaller the control current I(m, n) is (the greater the absolute value of the control current I(m, n) is). Also, the greater the value m is, the smaller the control current I(m, n) is (the greater the absolute value of the control current I(m, n) is).

control torque Tc to rotate the steering shaft 62 counterclockwise (in the positive direction). In this case, the greater the absolute value of the control current I(m, n) is, the greater the absolute value of the posture control torque Tc is. Then, in a view in the backward direction B, the vehicle body frame 21 rotates counterclockwise (in the negative direction) around the roll axis Ax at a roll rate ω.

As described above, the posture control actuator controller 606 controls the EPS actuator 606 to output a posture control torque Tc, based on the speed V and the roll rate ω. Then, the steering shaft 62 rotates, and the vehicle body frame 21 rotates clockwise or counterclockwise around the roll axis Ax in a view in the backward direction B. Accordingly, the posture of the vehicle body frame 21 changes. In this way, the posture control actuator controller 606 controls the posture of the vehicle body frame 21 based on the speed V and the roll rate ω.

Figure 6:
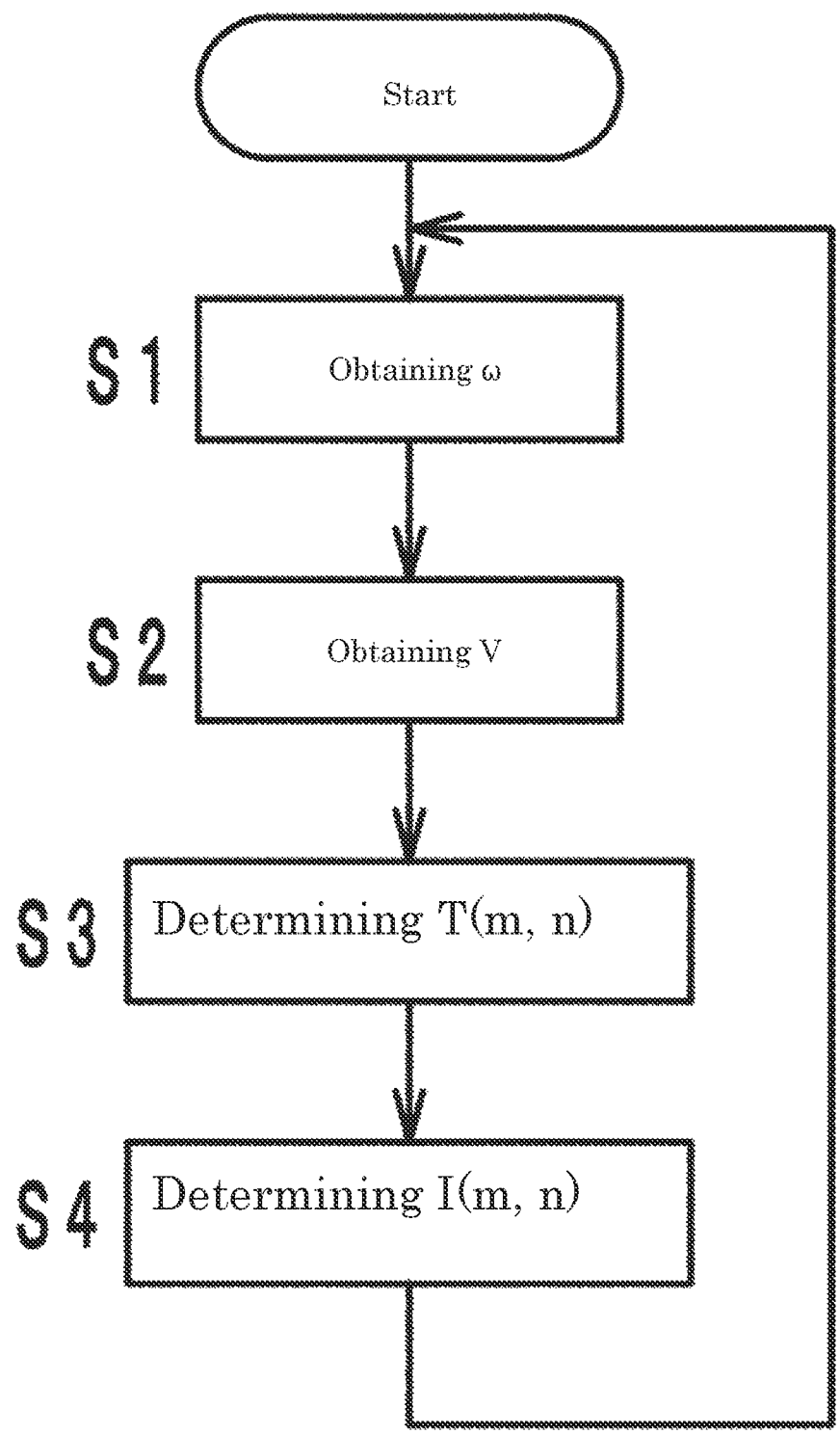
FIG. 6 is a flowchart showing operations carried out by the posture control actuator controller 606.

Next, operations of the posture control actuator controller 606 will be described with reference to the drawings. FIG. 6 is a flowchart showing operations performed by the posture control actuator controller 606. The posture control actuator controller 606 performs a process that will be described below along a software program stored in a storage device (not shown).

The process is started when an ignition source of the leaning vehicle 1a is turned on. As long as the ignition source is on, the roll rate sensor 602 keeps outputting the roll rate ω to the posture control actuator controller 606. Also, the speed sensor 604 keeps outputting the speed V to the posture control actuator controller 606.

The torque estimation section 614 obtains the roll rate ω from the roll rate sensor 602 (step S1). Further, the torque estimation section 614 obtains the speed V from the speed sensor 604 (step S2).

Next, the torque estimation section 614 identifies one of the roll rate values listed in the estimation steering torque table as shown in TABLE 1 as a roll rate ω(n) closest to the roll rate ω. Further, the torque estimation section 614 identifies one of the speed values listed in the estimation steering torque table as shown by TABLE 1 as a speed V(m) closest to the speed V. Then, the torque estimation section 614 determines an estimated steering torque T(m, n) in association with the roll rate ω(n) and the speed V(m) with reference to the estimation steering torque table as shown by TABLE 1 (step S3).

Next, the current determination section 616 determines a control current I(m, n) corresponding to the estimated steering torque T(m, n) determined by the torque estimation section 614 by using the control current determination table as shown by TABLE 2 (step S4). The current determination section 616 outputs the control current I(m, n) to the EPS actuator 600. The EPS actuator 600 outputs a posture control torque Tc corresponding to the control current I(m, n) to the steering shaft 62. Thereafter, the process returns to step S1. The process from step S1 to S4 is repeated until the ignition source is switched from on to off.

[Effects]

The roll rate sensor 602 of the posture control actuator unit 599 can detect a posture change of the vehicle body frame 21 with high accuracy. More specifically, the EPS actuator 600 outputs posture control power to control the posture of the vehicle body frame 21. For this purpose, the posture control actuator unit 599 is supported by the vehicle body frame 21 in such a manner as to be attachable to and detachable from the vehicle body frame 21. Accordingly, a posture change of the EPS actuator 600 is unlikely to delay relative to a posture change of the vehicle body frame 21. The EPS actuator 600 and the roll rate sensor 602 are incorporated in such a manner as not to be displaceable relative to each other. Accordingly, a posture change of the roll rate sensor 602 is unlikely to delay relative to a posture change of the vehicle body frame 21. Therefore, the roll rate sensor 602 of the posture change actuator unit 599 can detect a posture change of the vehicle body frame 21 with high accuracy.

The roll rate sensor 602 of the posture control actuator unit 599 can detect a posture change of the vehicle body frame 21 with high accuracy. More specifically, the EPS actuator 600 outputs posture control power to control the posture of the vehicle body frame 21. For this purpose, the EPS actuator 600 is designed to be positioned at a predetermined angle to the roll axis Ax or the like that is associated with a posture change of the vehicle body frame 21. For example, the EPS actuator 600 may be positioned such that its rotation axis is parallel to the steering shaft. Thus, the EPS actuator 600 is attached to the vehicle body frame 21 with high positional accuracy. The EPS actuator 600 and the roll rate sensor 602 are incorporated in such a manner as not to be displaceable relative to each other. Accordingly, the roll rate sensor 602 is attached to a sensor mounting position of the vehicle body frame 21 with high accuracy. Therefore, the roll rate sensor 602 of the posture control actuator unit 599 can detect a posture change of the vehicle body frame 21 with high accuracy.

The roll rate sensor 602 of the posture control actuator unit 599 can detect the roll rate of the vehicle body frame 21 with high accuracy also for the following reason. More specifically, the posture control actuator unit 599 is positioned to overlap the center line C in a view in the backward direction b. The roll rate sensor 602 is included in the posture control actuator unit 599. Accordingly, the roll rate sensor 602 is positioned near the center line C in a view in the backward direction b. Accordingly, the roll rate sensor 602 of the posture control actuator unit 599 can detect the roll rate ω with high accuracy. Since the roll rate sensor 602 can detect the roll rate ω with high accuracy, the posture control actuator controller 606 can accurately control the posture of the vehicle frame body 21 through the EPS actuator 600.

Also, the EPS actuator 600 of the posture control actuator unit 599 is attached to the vehicle body frame 21 with high positional accuracy. Accordingly, it is easy to make the axis for the roll rate detection carried out by the roll rate sensor 602 almost parallel to the roll axis Ax of the vehicle body frame 21. Then, the roll rate sensor 602 can detect the roll rate of the vehicle body frame 21 with high accuracy. Even when the axis for the roll rate detection carried out by the roll rate sensor 602 is not parallel to the roll axis Ax of the vehicle body frame 21, it is easy to identify the angle formed between the axis for the roll rate detection carried out by the roll rate sensor 602 and the roll axis Ax of the vehicle body frame 21. Accordingly, it is easy to make a correction to the roll rate detected by the roll rate sensor 602.

The posture control actuator unit 599 can be downsized. More specifically, in the posture control actuator unit 599, the EPS actuator 600 and the roll rate sensor 602 are incorporated in such a manner as not to be displaceable relative to each other. Accordingly, it is not necessary to provide a mount for attachment of the roll rate sensor 602 to the vehicle body frame 21. Therefore, the number of components of the posture control actuator unit 599 can be reduced, and the posture control actuator unit 599 can be downsized.

The posture control actuator controller 606 of the posture control actuator unit 599 controls the rotation of the steering shaft 62 based on the roll rate ω of the vehicle body frame 21 accurately detected by the roll rate sensor 602. When the steering shaft 62 rotates, the vehicle body frame 21 rotates around the roll axis Ax. Accordingly, the posture control actuator controller 606 of the posture control actuator unit 599 can control the posture of the vehicle body frame 21 accurately.

Second Embodiment

[Overall Structure]

Figure 7:
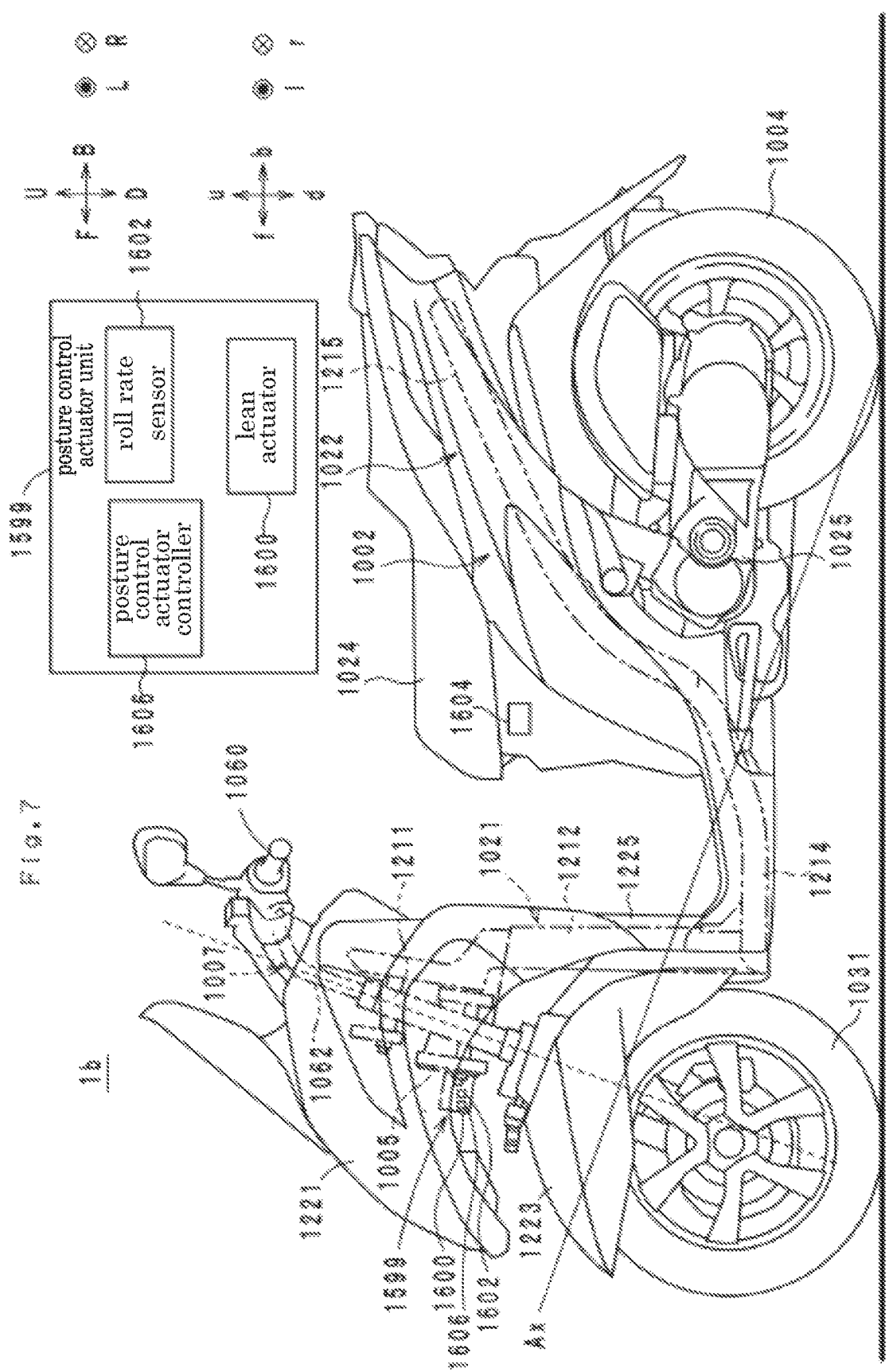
FIG. 7 is a looking-to-the-right (r) view of the leaning vehicle 1b when its vehicle body frame 21 is in an upright posture.
Figure 8:
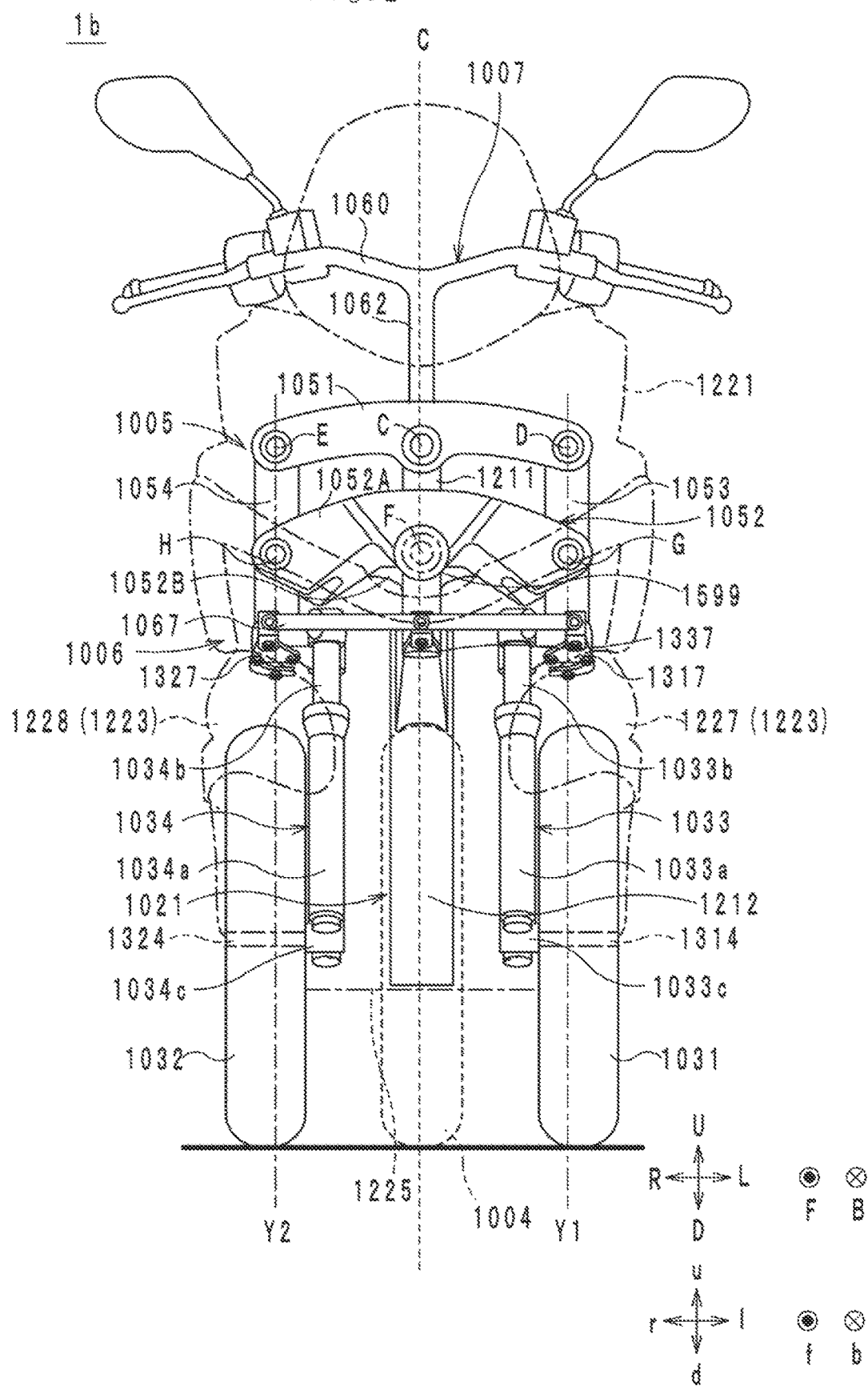
FIG. 8 is a looking-to-the-back (b) view of a front part of the leaning vehicle 1b when its vehicle body frame 21 is in an upright posture.

The overall structure of a leaning vehicle 1b according to a second embodiment will hereinafter be described with reference to the drawings. In the present embodiment, a three-wheeled leaning vehicle including a vehicle body frame capable of leaning, two front wheels, and a rear wheel is described as an example of the leaning vehicle 1b. FIG. 7 is a looking-to-the-right (r) view of the leaning vehicle 1b when the vehicle body frame is in an upright posture. FIG. 8 is a looking-to-the-back (b) view of the front part of the leaning vehicle 1b when the vehicle body frame is in an upright posture. In FIG. 8, the vehicle body cover is shown as being transparent.

As shown in FIG. 7, the leaning vehicle 1b includes a vehicle body 1002, a left front wheel 1031, a right front wheel 1032 (see FIG. 8), a rear wheel 1004, a link mechanism 1005, and a steering mechanism 1007. The vehicle body 1002 includes a vehicle body frame 1021, a vehicle body cover 1022, a seat 1024, and a power unit 1025.

The vehicle body frame 1021 leans in the leftward direction L when the leaning vehicle 1b is turning left. The vehicle body frame 1021 leans in the rightward direction R when the leaning vehicle 1b is turning right. The vehicle body frame 1021 includes a head pipe 1211, a down frame 1212, an underframe 1214, and a rear frame 1215. In FIG. 7, the part of the vehicle body frame 1021 behind the vehicle body cover 1022 is indicated by a chain line. The vehicle body frame 1021 supports the seat 1024, the power unit 1025, etc.

The head pipe 1211 is positioned in the front part of the leaning vehicle 1b. The front part of the leaning vehicle 1b is a part thereof that is farther in the forward direction f than the front edge of the seat 1024. The rear part of the leaning vehicle 1b is a part thereof that is farther in the backward direction b than the front edge of the seat 1024. The head pipe 1211 is inclined from the up-down direction ud such that the upper end part of the head pipe 1211 is positioned farther in the backward direction b than the lower end part of the head pipe 1211 in a view in the leftward direction 1 or the rightward direction r.

The down frame 1212 is positioned farther in the backward direction b than the head pipe 1211. The down frame 1212 is a cylindrical member extending along the up-down direction ud. The upper end part of the down frame 1212 is positioned farther in the backward direction b than the head pipe 1211 in a view in the rightward direction r. The down frame 1212 extends from the upper end part of the down frame 1212 to the downward direction d. The upper end part of the down frame 1212 is fixed to the lower end part of the head pipe 1211 via a connecting part (not shown).

The underframe 1214 extends from the lower end part of the down frame 1212 to the backward direction b. The rear frame 1215 linearly extends from the rear edge of the underframe 1214 to a backward and upward direction b, u.

The vehicle body frame 1021 is covered by the vehicle body cover 1022. The vehicle body cover 1022 includes a front cover 1221, a pair of right and left front fenders 1223, and a leg shield 1225. The front cover 1221 is positioned farther in the forward direction f than the seat 1024. The front cover 1221 covers at least some part of the steering mechanism 1007 and the link mechanism 1005.

The power unit 1025 includes a power source, such as an engine, an electric motor or the like, and a power transmission system, such as a transmission device or the like.

The seat 1024 is to be sat on by a rider. The seat 1024 is supported by the rear frame 1215.

The left front wheel 1031 is a left steerable wheel of the leaning vehicle 1b. The left front wheel 1031 is positioned in the front part of the leaning vehicle 1b. As shown in FIG. 8, the left front wheel 1031 is positioned farther in the leftward direction 1 than the center of the vehicle body frame 1021 with respect to the left-right direction lr. The left front wheel 1031 is rotatable around a left front axle 1314 (an example of an axle of a left steerable wheel).

The right front wheel 1032 is a right steerable wheel of the leaning vehicle 1b. The right front wheel 1032 is positioned in the front part of the leaning vehicle 1b. As shown in FIG. 8, the right front wheel 1032 is positioned farther in the rightward direction r than the center of the vehicle body frame 1021 with respect to the left-right direction lr. The right front wheel 1032 is rotatable around a right front axle 1324 (an example of an axle of a right steerable wheel). The left front wheel 1031 and the right front wheel 1032 are arranged lateral-symmetrically with respect to the center.

As shown in FIG. 8, the pair of front fenders 1223 includes a left front fender 1227 and a right front fender 1228. The left front fender 1227 is positioned farther in the upward direction u than the left front wheel 1031. The right front fender 1228 is positioned farther in the upward direction u than the right front wheel 1032.

The rear wheel 1004 is a driving wheel of the leaning vehicle 1b. The rear wheel 1004 is rotated by a driving force generated by the power unit 1025. The rear wheel 1004 is positioned in the rear part of the leaning vehicle 1b. The rear wheel 1004 is rotatable around an axle.

[Steering Mechanism]

The steering mechanism 1007 will hereinafter be described with reference to the drawings. FIG. 9 is a looking-to-the-down (d) view of the front part of the leaning vehicle 1b when the vehicle frame body 1021 is in an upright posture. In FIG. 9, the vehicle body cover 1022 is shown as being transparent.

The steering mechanism 1007 is configured to steer the left front wheel 1031 and the right front wheel 1032 in accordance with the rider's manipulation. As shown in FIGS. 8 and 9, the steering mechanism 1007 includes a left shock absorber 1033, a right shock absorber 1034, a handlebar 1060, a steering shaft 1062, a tie rod 1067, a left bracket 1317, a right bracket 1327, and a center bracket 1337.

The left shock absorber 1033 supports the left front wheel 1031 such that the left front wheel 1031 is movable along the up-down direction ud relative to the vehicle body frame 1021. The left shock absorber 1033 includes a left lower portion 1033a, a left upper portion 1033b, and a left support portion 1033c. The left lower portion 1033a extends along the up-down direction ud. The left support portion 1033c is positioned in the lower end part of the left lower portion 1033a. The left support portion 1033c supports the left front wheel 1031 such that the left front wheel 1031 is rotatable. The left front wheel 1031 is rotatable around the left front axle 1314. The left front axle 1314 extends from the left support portion 1033c to the leftward direction 1. The left upper portion 1033b extends along the up-down direction ud. The left upper portion 1033b is positioned farther in the upward direction u than the left lower portion 1033a with the lower end part thereof inserted in the left lower portion 1033a. The upper end part of the left upper portion 1033b is fixed to the left bracket 1317, which will be described later. Accordingly, the left upper portion 1033b is supported by a left-side member 1053, which will be described later.

The left shock absorber 1033 is what is called a telescopic shock absorber. The left shock absorber 1033, for example, includes a combination of a damper and a spring. The left upper portion 1033b moves relative to the left lower portion 1033a in the extending direction of the left lower portion 1033a, and accordingly, the left shock absorber 1033 is expandable in the direction. In this way, the left shock absorber 1033 absorbs displacements of the left front wheel 1031 in the up-down direction ud relative to the left upper portion 1033b.

The right shock absorber 1034 supports the right front wheel 1032 such that the right front wheel 1032 is movable along the up-down direction ud relative to the vehicle body frame 1021. The right shock absorber 1034 includes a right lower portion 1034a, a right upper portion 1034b, and a right support portion 1034c. The right lower portion 1034a extends along the up-down direction ud. The right support portion 1034c is positioned in the lower end part of the right lower portion 1034a. The right support portion 1034c supports the right front wheel 1032 such that the right front wheel 1032 is rotatable. The right front wheel 1032 is rotatable around the right front axle 1324. The right front axle 1324 extends from the right support portion 1034c to the rightward direction r. The right upper portion 1034*b* extends along the up-down direction ud. The right upper portion 1034*b* is positioned farther in the upward direction u than the right lower portion 1034*a* with the lower end part thereof inserted in the right lower portion 1034*a*. The upper end part of the right upper portion 1034*b* is fixed to the right bracket 1327, which will be described later. Accordingly, the right upper portion 1034*b* is supported by a right side member 1054, which will be described later.

The right shock absorber 1034 is what is called a telescopic shock absorber. The right shock absorber 1034, for example, includes a combination of a damper and a spring. The right upper portion 1034*b* moves relative to the right lower portion 1034*a* in the extending direction of the right lower portion 1034*a*, and accordingly, the right shock absorber 1034 is expandable in the direction. In this way, the right shock absorber 1034 absorbs displacements of the right front wheel 1032 in the up-down direction ud relative to the right upper portion 1034*b*.

The handlebar 1060 is to be manipulated by the rider. The steering shaft 1062 is supported by the vehicle body frame 1021 in such a manner as to be rotatable on its central axis in accordance with the rider's manipulation of the handlebar 1060. More specifically, the steering shaft 1062 is inserted in the head pipe 1211 and thereby is supported by the head pipe 1211 in such a manner as to be rotatable. The handlebar 1060 is fixed to the upper end part of the steering shaft 1062. Then, when the rider manipulates the handlebar 1060, the steering shaft 1062 rotates on its central axis.

The center bracket 1337 is fixed to the lower end part of the steering shaft 1062. Accordingly, the center bracket 1337 is rotatable around the central axis of the steering shaft 1062 together with the steering shaft 1062.

The tie rod 1067 transmits the rotation of the steering shaft 1062 caused by the rider's manipulation of the handlebar 1060 to the left shock absorber 1033 and the right shock absorber 1034. The tie rod 1067 extends along the left-right direction LR. The center of the tie rod 1067 with respect to the left-right direction LR is supported by the center bracket 1337. The left end part of the tie rod 1067 is supported by the left bracket 1317. The right end part of the tie rod 1067 is supported by the right bracket 1327.

[Link Mechanism]

The link mechanism 1005 will hereinafter be described with reference to FIGS. 8 and 9. The link mechanism 1005 is a parallelogram link mechanism. The link mechanism 1005 is positioned farther in the downward direction d than the handlebar 1060. The link mechanism 1005 is supported by the head pipe 1211 of the vehicle body frame 1021.

The link mechanism 1005 includes an upper cross member 1051, a lower cross member 1052, a left side member 1053 and a right side member 1054. The upper cross member 1051, the lower cross member 1052, the left side member 1053 and the right side member 1054 are link members that are displaceable relative to the vehicle body frame 1021. In the present specification, a displacement includes a displacement by translation, a displacement by rotation, and a displacement by combination of translation and rotation.

The upper cross member 1051 extends along the left-right direction LR. The upper cross member 1051 is positioned farther in the forward direction f than the head pipe 1211 and farther in the upward direction u than the left front wheel 1031 and the right front wheel 1032. The upper cross member 1051 is supported by the head pipe 1211 via a support C. The support C is positioned in a middle part of the upper cross member 1051 and in the upper part of the head pipe 1211. When the upper cross member 1051 is divided into three equal parts along the left-right direction LR, the part positioned farthest in the leftward direction L of the three parts is a left part of the upper cross member 1051. The part positioned farthest in the rightward direction R of the three parts is a right part of the upper cross member 1051. The middle part of the upper cross member 1051 is the part positioned in the middle of the three parts. The support C is a shaft extending along the front-back direction fb. The support C extends from the head pipe 1211 to the forward direction f, slightly inclined to the upward direction u. The upper cross member 1051 is rotatable around the support C and accordingly rotatable relative to the head pipe 1211.

The lower cross member 1052 includes a front lower cross member 1052A and a rear lower cross member 1052B. The front lower cross member 1052A extends along the left-right direction LR. The front lower cross member 1052A is positioned farther in the forward direction f than the head pipe 1211, farther in the downward direction d than the upper cross member 1051, and farther in the upward direction u than the left front wheel 1031 and the right front wheel 1032. The front lower cross member 1052A is supported by the head pipe 1211 via a support F. The support F is positioned in a middle part of the front lower cross member 1052A and in the lower part of the head pipe 1211. When the front lower cross member 1052A is divided into three equal parts along the left-right direction LR, the part positioned farthest in the leftward direction L of the three parts is a left part of the front lower cross member 1052A. The part positioned farthest in the rightward direction R of the three parts is a right part of the front lower cross member 1052A. The middle part of the front lower cross member 1052A is the part positioned in the middle of the three parts. The support F is a shaft extending along the front-back direction fb. The support F extends from the head pipe 1211 to the forward direction f, slightly inclined to the upward direction u. The front lower cross member 1052A is rotatable around the support F and accordingly rotatable relative to the head pipe 1211.

The rear lower cross member 1052B extends along the left-right direction LR. The rear lower cross member 1052B is positioned farther in the backward direction b than the head pipe 1211, farther in the downward direction d than the upper cross member 1051, and farther in the upward direction u than the left front wheel 1031 and the right front wheel 1032. The rear lower cross member 1052B is supported by the head pipe 1211 via the support F. The support F is positioned in a middle part of the rear lower cross member 1052B and in the lower part of the head pipe 1211. When the rear lower cross member 1052B is divided into three equal parts along the left-right direction LR, the part positioned farthest in the leftward direction L of the three parts is a left part of the rear lower cross member 1052B. The part positioned farthest in the rightward direction R of the three parts is a right part of the rear lower cross member 1052B. The middle part of the rear lower cross member 1052B is the part positioned in the middle of the three parts. As mentioned above, the support F is a shaft extending along the front-back direction fb. The support F extends from the head pipe 1211 also to the backward direction b, slightly inclined to the downward direction d. The rear lower cross member 1052B is rotatable around the support F and accordingly rotatable relative to the head pipe 1211.

The left side member 1053 extends along the up-down direction ud. Accordingly, the extending direction of the left side member 1053 is parallel to the extending direction of the head pipe 1211. The left side member 1053 is positioned farther in the leftward direction 1 than the head pipe 1211. The left side member 1053 is positioned farther in the upward direction u than the left front wheel 1031 and farther in a left-upward direction lu than the left shock absorber 1033. The left side member 1053 is supported by the upper cross member 1051 via a support D. The support D is positioned in the upper part of the left side member 1053 and in the left part of the upper cross member 1051. The support D is a shaft extending along the front-back direction fb. The left side member 1053 is rotatable around the support D and accordingly rotatable relative to the upper cross member 1051.

Also, the left side member 1053 is supported by the front lower cross member 1052A and the rear lower cross member 1052B via a support G. The support G is positioned in the lower part of the left side member 1053, in the left part of the front lower cross member 1052A and in the left part of the rear lower cross member 1052B. The support G is a shaft extending along the front-back direction fb. The left side member 1053 is rotatable around the support G and accordingly rotatable relative to the front lower cross member 1052A and the rear lower cross member 1052B.

The left bracket 1317 is supported by the lower end part of the left side member 1053. The left bracket 1317 is rotatable around a left central axis Y1 and rotatable relative to the left side member 1053. The left central axis Y1 is a central axis of the left side member 1053. The left central axis Y1 extends along the up-down direction ud.

The right side member 1054 extends along the up-down direction ud. Accordingly, the extending direction of the right side member 1054 is parallel to the extending direction of the head pipe 1211. The right side member 1054 is positioned farther in the rightward direction r than the head pipe 1211. The right side member 1054 is positioned farther in the upward direction u than the right front wheel 1032 and farther in a right-upward direction ru than the right shock absorber 1034. The right side member 1054 is supported by the upper cross member 1051 via a support E. The support E is positioned in the upper part of the right side member 1054 and in the right part of the upper cross member 1051. The support E is a shaft extending along the front-back direction fb. The right side member 1054 is rotatable around the support E and accordingly rotatable relative to the upper cross member 1051.

Also, the right side member 1054 is supported by the front lower cross member 1052A and the rear lower cross member 1052B via a support H. The support H is positioned in the lower part of the right side member 1054 and in the right part of the front lower cross member 1052A and in the right part of the rear lower cross member 1052B. The support H is a shaft extending along the front-back direction fb. The right side member 1054 is rotatable around the support H and accordingly rotatable relative to the front lower cross member 1052A and the rear lower cross member 1052B.

The right bracket 1327 is supported by the lower end part of the right side member 1054. The right bracket 1327 is rotatable around a right central axis Y2 and rotatable relative to the right side member 1054. The right central axis Y2 is a central axis of the right side member 1054. The right central axis Y2 extends along the up-down direction ud.

As described above, the upper cross member 1051, the lower cross member 1052, the left side member 1053 and the right side member 1054 are connected to one another such that the upper cross member 1051 and the lower cross member 1052 are kept parallel to each other and such that the left side member 1053 and the right side member are kept parallel to each other.

The left shock absorber 1033 is positioned farther in a right-downward direction rd than the left side member 1053. The left shock absorber 1033 is supported by the left bracket 1317. Specifically, the upper end part of the left shock absorber 1033 is fixed to the left bracket 1317. Further, the left shock absorber 1033 supports the left front wheel 1031. Accordingly, the left side member 1053 supports the left front wheel 1031 via the left bracket 1317 and the left shock absorber 1033. In this way, the link mechanism 1005 supports the left front wheel 1031. The left shock absorber 1033 leans in the left-right direction LR together with the left side member 1053.

The right shock absorber 1034 is positioned farther in a left-downward direction ld than the right side member 1054. The right shock absorber 1034 is supported by the right bracket 1327. Specifically, the upper end part of the right shock absorber 1034 is fixed to the right bracket 1327. Further, the right shock absorber 1034 supports the right front wheel 1032. Accordingly, the right side member 1054 supports the right front wheel 1032 via the right bracket 1327 and the right shock absorber 1034. In this way, the link mechanism 1005 supports the right front wheel 1032. The right shock absorber 1034 leans in the left-right direction LR together with the right side member 1054.

[Steering Motion]

Figure 10:
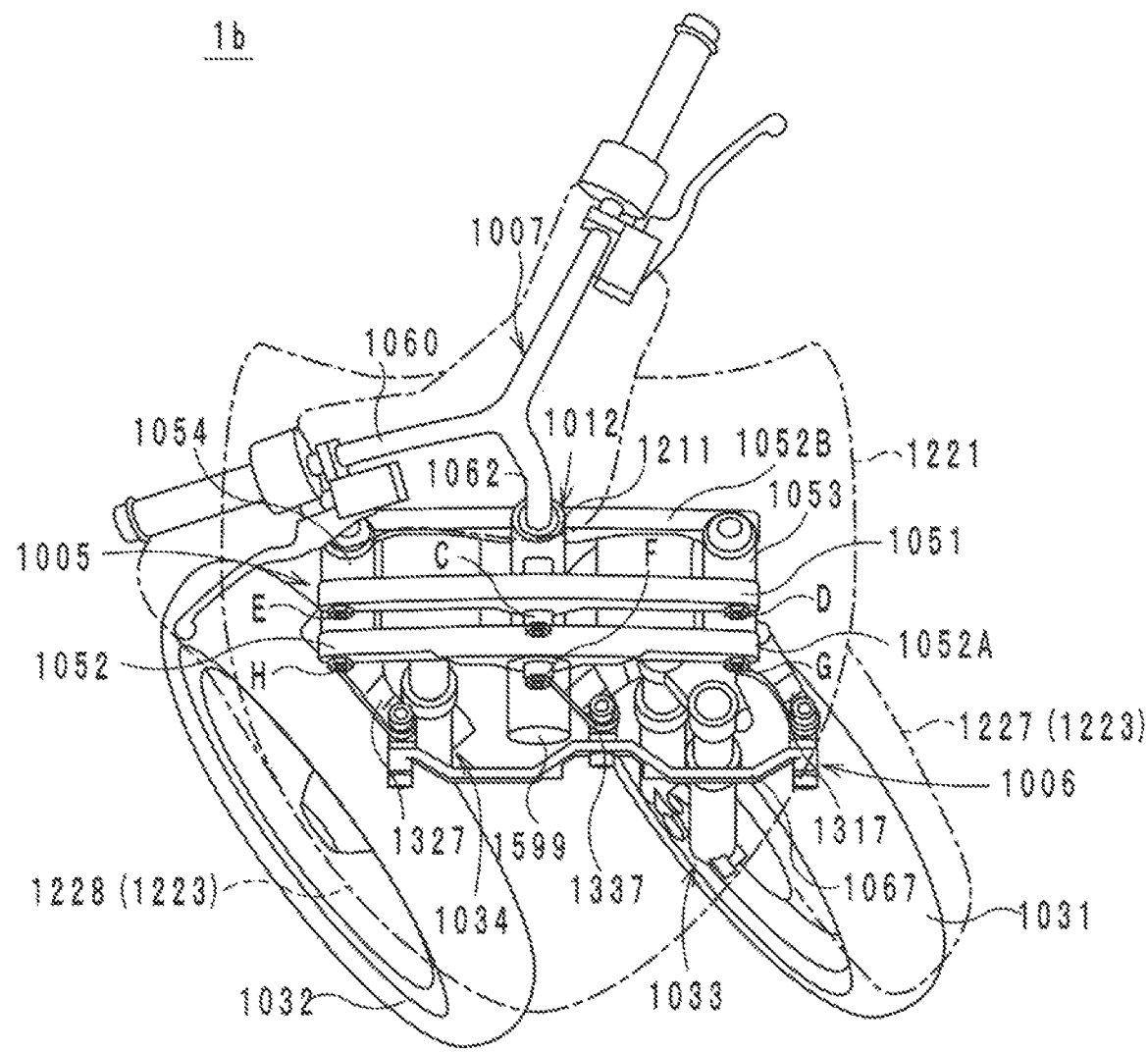
FIG. 10 is a looking-to-the-down (d) view of the front part of the leaning vehicle 1b when the leaning vehicle 1b is steered leftward.

Next, steering motions of the leaning vehicle 1b are described with reference to FIG. 10. FIG. 10 is a looking-to-the-down (d) view of the front part of the leaning vehicle 1b when the leaning vehicle 1b is steered leftward.

As shown in FIG. 10, when the rider steers the handlebar 60 leftward, the steering shaft 1062 rotates counterclockwise in a view in the downward direction d. Since the center bracket 1337 is fixed to the lower end part of the steering shaft 1062, the center bracket 1337 rotates counterclockwise in a view in the downward direction d together with the steering shaft 1062.

The tie rod 1067 makes a parallel translation in a backward and leftward direction 1, b with the rotation of the center bracket 1337. The left end part of the tie rod 1067 is supported by the front end part of the left bracket 1317. The left bracket 1317 is rotatable around the left central axis Y1 (see FIG. 8). Accordingly, with the parallel translation of the tie rod 1067, the left bracket 1317 rotates counterclockwise in a view in the downward direction d. Also, the right end part of the tie rod 1067 is fixed to the front end part of the right bracket 1327. The right bracket 1327 is rotatable around the right central axis Y2 (see FIG. 8). Accordingly, with the parallel translation of the tie rod 1067, the right bracket 1327 rotates counterclockwise in a view in the downward direction d.

The left front wheel 1031 is connected to the left bracket 1317 via the left shock absorber 1033. Therefore, with the rotation of the left bracket 1317, the left front wheel 1031 rotates counterclockwise around the left central axis Y1 (see FIG. 8) in a view in the downward direction d. Also, the right front wheel 1032 is connected to the right bracket 1327 via the right shock absorber 1034. Therefore, with the rotation of the right bracket 1327, the right front wheel 1327 rotates counterclockwise around the right central axis Y2 (see FIG. 8) in a view in the downward direction d.

When the rider steers the handlebar 1060 rightward, each of the elements described above rotates in a direction opposite to the direction of rotation when the rider steers the handlebar 1060 leftward (that is, rotates clockwise). Thus, the motion of each of the elements is laterally reversed, and no more description will be provided.

[Leaning Motion]

Figure 11:
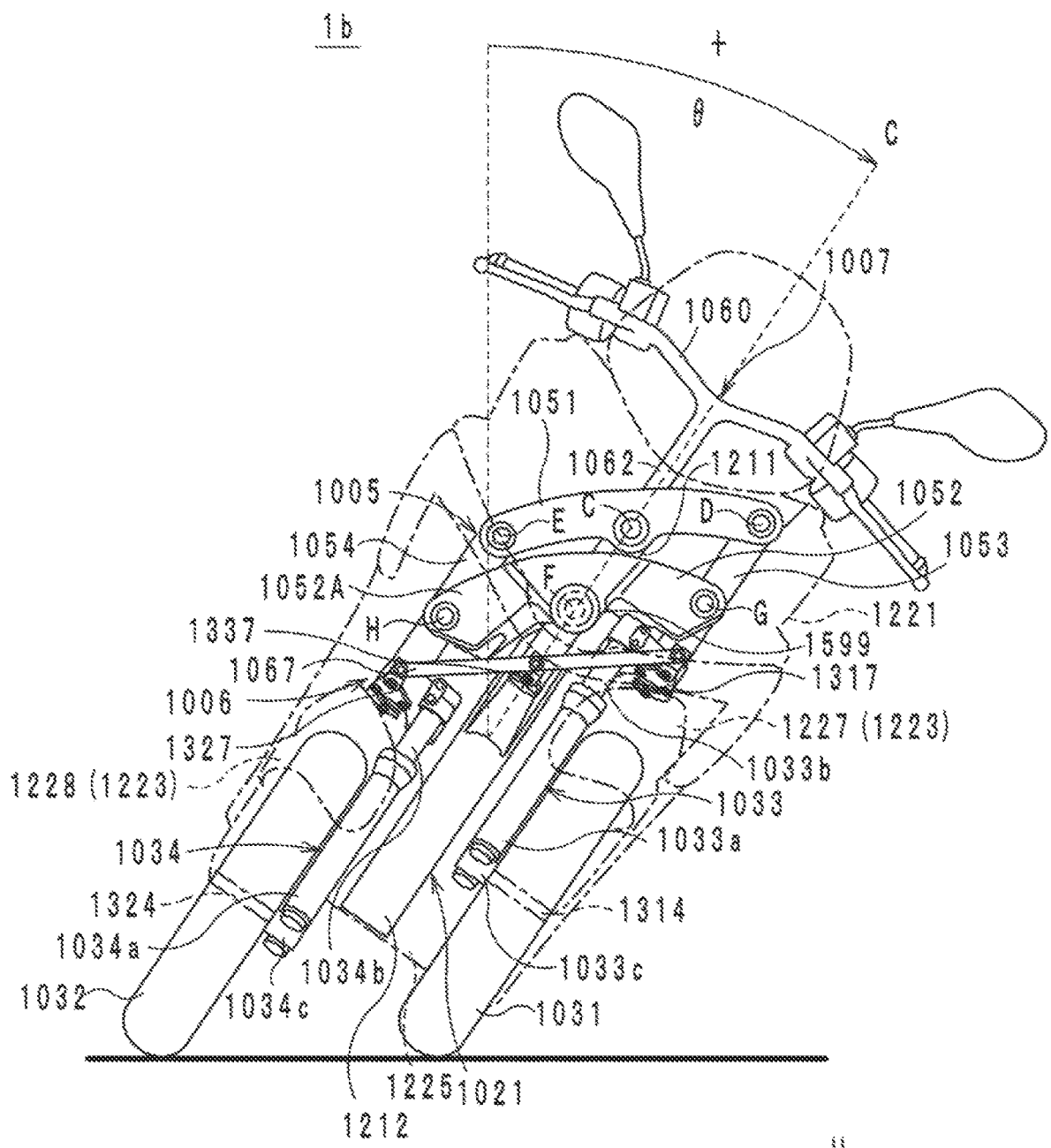
FIG. 11 is a looking-to-the-back (b) view of the front part of the leaning vehicle 1b when its vehicle body frame 1021 is leaning in a leftward direction L.

Next, leaning motions of the leaning vehicle 1b are described with reference to the drawings. FIG. 11 is a looking-to-the-back (b) view of the front part of the leaning vehicle 1b when the vehicle body frame 1021 leans in the leftward direction L.

The vehicle body frame 1021 rotates around the roll axis Ax and thereby leans in the leftward direction L or the rightward direction R. The roll axis Ax is an axis extending along the front-back direction FB. More specifically, as shown in FIG. 7, the roll axis Ax is a straight line that passes the contact point between the rear wheel 1004 and the ground and is perpendicular to the steering shaft 1062 when the vehicle body frame 1021 is in an upright posture.

As the vehicle body frame 1021 is rotating around the roll axis Ax, the rotation angle of the vehicle body frame 1021 around the roll axis Ax changes, and the rotation angle of the vehicle body frame 1021 around the roll axis Ax is referred to as a roll angle $\theta$. The roll angle $\theta$ of the leaning vehicle 1b is the same as the roll angle $\theta$ of the leaning vehicle 1a, and the description is omitted.

As shown in FIG. 11, when the leaning vehicle 1b is turning left, the upper cross member 1051, the lower cross member 1052, the left side member 1053 and the right side member 1054 of the link mechanism 1005 displace relative to the vehicle body frame 1021 such that the left front axle 1314 is positioned farther in the upward direction u than the right front axle 1324, and thereby, the vehicle body frame 1021 is caused to lean in the leftward direction L. In this case, the roll angle $\theta$ is a positive value. Also, when the leaning vehicle 1b is turning right, the upper cross member 1051, the lower cross member 1052, the left side member 1053 and the right side member 1054 of the link mechanism 1005 displace relative to the vehicle frame body 1021 such that the right front axle 1324 is positioned farther in the upward direction u than the left front axle 1314, and thereby, the vehicle body frame 1021 is caused to lean in the rightward direction R. In this case, the roll angle $\theta$ is a negative value. A case in which the vehicle body frame 1021 leans in the leftward direction L will be described below as an example.

As shown in FIG. 11, the vehicle body frame 1021 is changed from an upright posture to a leaning posture in the leftward direction L by a shape change of the link mechanism 1005. Specifically, as shown in FIG. 8, when the vehicle body frame 1021 is in an upright posture, the upper cross member 1051, the lower cross member 1052, the left side member 1053 and the right side member 1054 form a rectangle in the leaning vehicle 1b. On the other hand, as shown in FIG. 11, when the vehicle body frame 1021 leans in the leftward direction L, the upper cross member 1051, the lower cross member 1052, the left side member 1053 and the right side member 1054 form a parallelogram in the leaning vehicle 1b.

When the rider causes the vehicle body frame 1021 to lean in the leftward direction L, the head pipe 1211 leans in the leftward direction L. When the head pipe 1211 leans in the leftward direction L, the upper cross member 1051 rotates around the support C in such a manner as to rotate counterclockwise relative to the head pipe 1211 in a view in the backward direction b. In the same way, the lower cross member 1052 rotates around the support F in such a manner as to rotate counterclockwise relative to the head pipe 1211 in a view in the backward direction b. Then, in a view in the backward direction b, the upper cross member 1051 moves in the leftward direction L relative to the lower cross member 1052.

With the movement of the upper cross member 1051, the left side member 1053 rotates around the support D in such a manner as to rotate clockwise relative to the upper cross member 1051 in a view in the backward direction b. The right side member 1054 rotates around the support E in such a manner as to rotate clockwise relative to the upper cross member 1051 in a view in the backward direction b. With the movement of the upper cross member 1051, also, the left side member 1053 rotates around the support G in such a manner as to rotate clockwise relative to the lower cross member 1052 in a view in the backward direction b. The right side member 1054 rotates around the support H in such a manner as to rotate clockwise relative to the lower cross member 1052 in a view in the backward direction b. In this way, the left side member 1053 and the right side member 1054 lean in the leftward direction L while being kept parallel to the head pipe 1211.

The left bracket 1317 is supported by the lower end part of the left side member 1053. Therefore, when the left side member 1053 leans in the leftward direction L, the left bracket 1317 leans in the leftward direction L. The left shock absorber 1033 is supported by the left bracket 1317, and therefore, when the left bracket 1317 leans in the leftward direction L, the left shock absorber 1033 leans in the leftward direction L. The left front wheel 1031 is supported by the lower end part of the left shock absorber 1033, and therefore, when the left shock absorber 1033 leans in the leftward direction L, the left front wheel 1031 leans in the leftward direction L.

The right bracket 1327 is supported by the lower end part of the right side member 1054. Therefore, when the right side member 1054 leans in the leftward direction L, the right bracket 1327 leans in the leftward direction L. The right shock absorber 1034 is supported by the right bracket 1327, and therefore, when the right bracket 1327 leans in the leftward direction L, the right shock absorber 1034 leans in the leftward direction L. The right front wheel 1032 is supported by the lower end part of the right shock absorber 1034, and therefore, when the right shock absorber 1034 leans in the leftward direction L, the right front wheel 1032 leans in the leftward direction L.

The rear wheel 1004 (not shown in FIG. 11) is supported by the vehicle body frame 1021. Therefore, the rear wheel 1004 leans in the leftward direction L together with the vehicle body frame 1021.

When the vehicle body frame 1021 leans in the rightward direction R, each of the elements described above moves in a direction opposite to the direction of motion when the vehicle body frame 1021 is leaning in the leftward direction L. Thus, the motion of each of the elements is laterally reversed, and no more description will be provided.

[Posture Control Actuator Controller]

Figure 12:
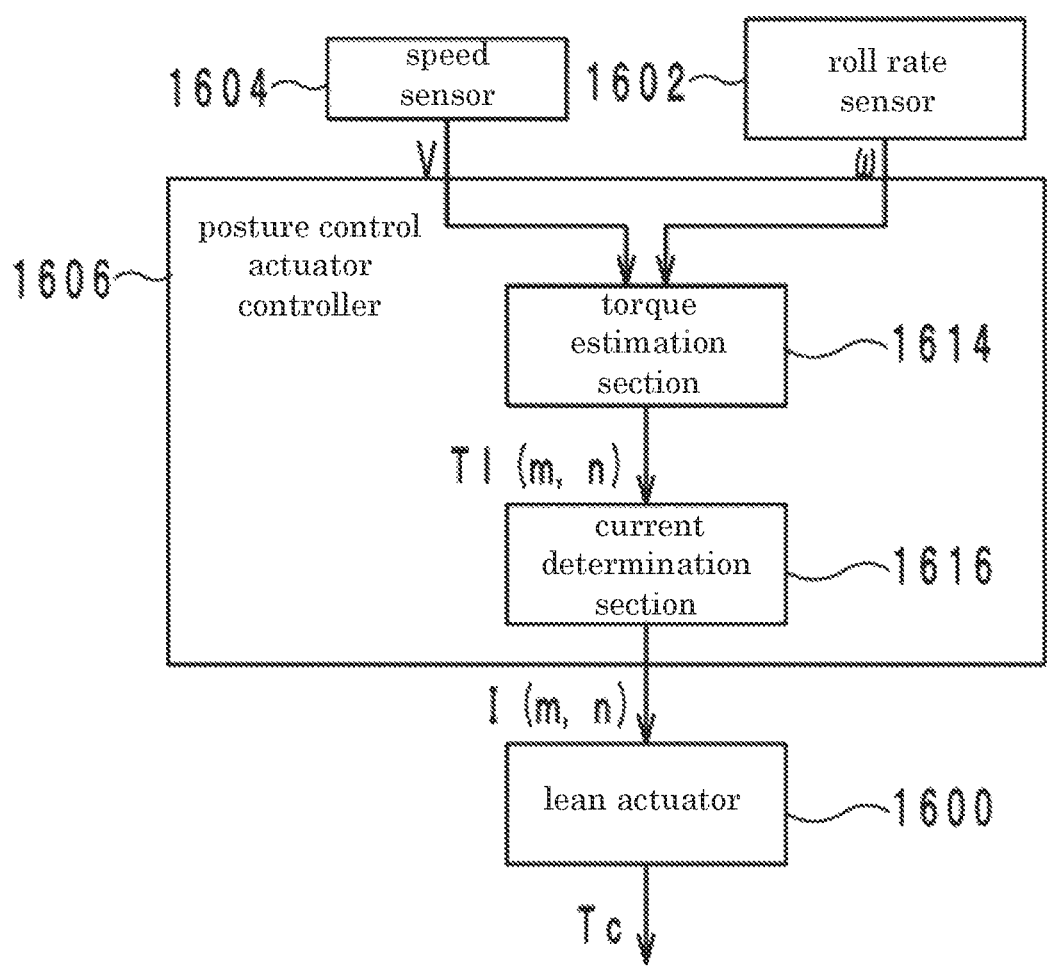
FIG. 12 is a block diagram of a posture control actuator controller 1606.

Next, the posture control actuator controller 1606 of the leaning vehicle 1b will be described with reference to the drawings. FIG. 12 is a block diagram of the posture control actuator controller 1606.

As shown in FIG. 7, the leaning vehicle 1b further includes a posture control actuator unit (posture control actuator device) 1599, and a speed sensor 1604.

The posture control actuator unit 1599 includes a lean actuator 1600, a roll rate sensor 1602, and a posture control actuator controller 1606. The lean actuator (an example of a posture control actuator) outputs a posture control torque Tc to displace the upper cross member 1051, the lower cross member 1052, the left side member 1053 and the right side member 1054 relative to the vehicle body frame 1021. The posture control torque Tc is a torque to control the posture of the vehicle body frame 1021. In order to cause the vehicle body 1021 to lean, it is necessary to apply a torque to the lower cross member 1052. A lean torque Tl is applied to the lower cross member 1052, and the lean torque Tl has a strength required to cause the vehicle body frame 1021 running at a speed V to roll at a roll rate ω. The lean torque Tl acts around the support F. The direction of the lean torque Tl that causes a counterclockwise rotation of the lower cross member 1052 in a view in the backward direction b is defined as a positive direction of the lean torque Tl. The direction of the lean torque Tl that causes a clockwise rotation of the lower cross member 1052 in a view in the backward direction b is defined as a negative direction of the lean torque Tl. The lean actuator 1600 outputs a posture control torque Tc to assist the lean torque Tl that the rider applies to the lower cross member 1052.

The lean actuator 1600 is fixed to the support F of the vehicle body frame 1021. The lean actuator 1600 is a combination of an electric motor and a gear. The electric motor generates a torque. The torque generated by the electric motor is outputted to the lower cross member 1052 as a posture control torque Tc via the gear. In this way, the lean actuator 1600 causes the lower cross member 1052 to rotate around the support F relative to the head pipe 1211.

The roll rate sensor 1602 detects the roll rate ω that is the amount of change per unit time of the roll angle θ. The roll rate ω of the leaning vehicle 1b is the same as the roll rate ω of the leaning vehicle 1a, and the description is omitted.

The speed sensor 1604 detects the speed V of the leaning vehicle 1b. The speed V is a positive value when the leaning vehicle 1b is running forward.

The posture control actuator controller 1606 controls the lean actuator 1600 based on the roll rate ω detected by the roll rate sensor 1602. The posture control actuator controller 1606 is, for example, an IC (integrated circuit) for control of the lean actuator 1600. However, the posture control actuator controller 1606 does not need to be achieved by a single IC, and the posture control actuator controller 1606 may be a combination of one or more ICs, one or more electronic components and/or one or more circuit boards.

As shown in FIG. 7, the lean actuator 1600, the roll rate sensor 1602 and the posture control actuator controller 1606 are incorporated in such a manner as not to be displaceable relative to one another, and the lean actuator 1600 is supported by the vehicle body frame 1021 in such a manner as to be attachable to and detachable from the vehicle body frame 1021. More specifically, for example, the roll rate sensor 1602 and the posture control actuator controller 1606 are fixed in a case of the lean actuator 1600. The means for fixing the roll rate sensor 1602 and the posture control actuator controller 1606 to the lean actuator 1600 may be a combination of a bolt and a nut, a screw, a snap-fit, an adhesive, an adhesive tape, welding, brazing, etc. The lean actuator 1600 is to output a posture control torque Tc to the lower cross member 1052. Therefore, the lean actuator 1600 is supported by the vehicle body frame 1021 in such a manner as not to be displaceable relative to the vehicle body frame 1021. In this structure, the roll rate sensor 1602 and the posture control actuator controller 1606 are not displaceable relative to the lean actuator 1600, and the lean actuator 1600 is not displaceable relative to the vehicle body frame 1021.

The lean actuator 1600 is fixed to the support F as shown in FIG. 8. Therefore, in a view in the backward direction b, the lean actuator 1600 overlaps the center line C. Accordingly, in a view in the backward direction b, the posture control actuator unit 1599 overlaps the center line C.

The description is now returned to the posture control actuator controller 1606. The posture control actuator controller 1606 obtains the roll rate ω from the roll rate sensor 1602. Specifically, an electric signal representing the roll rate ω (which will hereinafter be referred to simply as roll rate ca) detected by the roll rate sensor 1602 is inputted to the posture control actuator controller 1606.

The posture control actuator controller 1606 obtains the speed V from the speed sensor 1604. Specifically, an electric signal representing the speed V (which will hereinafter be referred to simply as speed V) detected by the speed sensor 1604 is inputted to the posture control actuator controller 1606.

The posture control actuator controller 1606 does not use a torque sensor that detects the steering torque T that is generated by the rider's manipulation of the handlebar 1060 and acts around the rotation axis (central axis of the steering shaft 1062), and uses the roll rate sensor 1602. Then, the posture control actuator controller 1606 controls the lean actuator 1600 not based on the steering torque T that is generated by the rider's manipulation of the handlebar 1060 and acts around the steering shaft 1062 but based on the roll rate ω sent from the roll rate sensor 1602. In the present embodiment, the posture control actuator controller 1606 uses neither a torque sensor that detects the steering torque T nor a roll sensor that detects the roll angle θ. The posture control actuator controller 1606 uses the roll rate sensor 1602 and the speed sensor 1604. Then, the posture control actuator controller 1606 controls the lean actuator 1600 based on neither the steering torque T detected by a torque sensor nor the roll angle θ detected by a roll sensor. The posture control actuator controller 1606 controls the lean actuator 1600 based on the roll rate ω sent from the roll rate sensor 1602 and the speed V sent from the speed sensor 1604.

As shown in FIG. 12, the posture control actuator controller 1606 includes a torque estimation section 1614 and a current determination section 1616. The torque estimation section 1614 determines an estimated lean torque value Tl (m, n), which is an estimated value of the lean torque Tl, based on the speed V and the roll rate ω. The values m and n are integers. The torque estimation section 1614 stores an estimated lean torque determination table as shown by TABLE 3.

TABLE 3

| | | | ω(n)(deg/s) | | | | | | | | | | |
|---|---|---|---|---|---|---|---|---|---|---|---|---|---|
| | | ... ω(−5) | ω(−4) | ω(−3) | ω(−2) | ω(−1) | ω(0) = 0 | ω(1) | ω(2) | ω(3) | ω(4) | ω(5) | ... |
| V(m) (km/h) | V(1) | ... Tl(1, −5) | Tl(1, −4) | Tl(1, −3) | Tl(1, −2) | Tl(1, −1) | Tl(1, 0) = 0 | Tl(1, 1) | Tl(1, 2) | Tl(1, 3) | Tl(1, 4) | Tl(1, 5) | ... |
| | V(2) | ... Tl(2, −5) | Tl(2, −4) | Tl(2, −3) | Tl(2, −2) | Tl(2, −1) | Tl(2, 0) = 0 | Tl(2, 1) | Tl(2, 2) | Tl(2, 3) | Tl(2, 4) | Tl(2, 5) | ... |
| | V(3) | ... Tl(3, −5) | Tl(3, −4) | Tl(3, −3) | Tl(3, −2) | Tl(3, −1) | Tl(3, 0) = 0 | Tl(3, 1) | Tl(3, 2) | Tl(3, 3) | Tl(3, 4) | Tl(3, 5) | ... |

TABLE 3-continued

| | | ω(n)(deg/s) | | | | | | | | | | |
|---|---|---|---|---|---|---|---|---|---|---|---|---|
| | ... ω(−5) | ω(−4) | ω(−3) | ω(−2) | ω(−1) | ω(0) = 0 | ω(1) | ω(2) | ω(3) | ω(4) | ω(5) | ... |
| V(4) | ... Tl(4, −5) | Tl(4, −4) | Tl(4, −3) | Tl(4, −2) | Tl(4, −1) | Tl(4, 0) = 0 | Tl(4, 1) | Tl(4, 2) | Tl(4, 3) | Tl(4, 4) | Tl(4, 5) | ... |
| V(5) | ... Tl(5, −5) | Tl(5, −4) | Tl(5, −3) | Tl(5, −2) | Tl(5, −1) | Tl(5, 0) = 0 | Tl(5, 1) | Tl(5, 2) | Tl(5, 3) | Tl(5, 4) | Tl(5, 5) | ... |
| ... | ... ... | ... | ... | ... | ... | ... | ... | ... | ... | ... | ... | ... |

In the estimated lean torque determination table, estimated lean torque values Tl (m, n) are stored in association with values of the speed V(m) and values of the roll rate ω (n). The speed V(m) and the roll rate ω(n) of the leaning vehicle 1b are the same as the speed V(m) and the roll rate ω(n) of the leaning vehicle 1a, and the description thereof is omitted.

When the value n is positive (when the roll rate ω(n) is a positive value), the estimated lean torque Tl (m, n) is a positive value. In this case, the estimated lean torque Tl (m, n) indicates a lean torque to cause the lower cross member 1052 to rotate counterclockwise (in the positive direction) in a view in the backward direction b. In this case, the greater the value n is (the greater the roll rate ω(n) is), the greater the estimated lean torque Tl (m, n) is. Also, the greater the value m is (the greater the speed V(m) is), the greater the estimated lean torque Tl (m, n) is.

On the other hand, when the value n is negative (when the roll rate ω(n) is a negative value), the estimated lean torque Tl (m, n) is a negative value. In this case, the estimated lean torque Tl (m, n) indicates a lean torque to cause the lower cross member 1052 to rotate clockwise (in the negative direction) in a view in the backward direction b. In this case, the smaller the value n is (the smaller the roll rate ω(n) is), the smaller the estimated lean torque Tl (m, n) is (the greater the absolute value of the estimated lean torque Tl (m, n) is). Also, the greater the value m is (the greater the speed V(m) is), the smaller the estimated lean torque Tl (m, n) is (the greater the absolute value of the estimated lean torque Tl (m, n) is).

The torque estimation section 1614 identifies a speed V(m) that is closest to the speed V that the posture control actuator controller 1606 has obtained. Also, the torque estimation section 1614 identifies a roll rate ω(n) that is closest to the roll rate ω that the posture control actuator controller 606 has obtained. Then, the torque estimation section 1614 determines an estimated lean torque value Tl(m, n) in association with the speed V(m) and the roll rate ω(n) with reference to TABLE 3.

The current determination section 1616 controls the lean actuator 1600 based on the estimated lean torque value Tl(m, n) determined by the torque estimation section 1614. Specifically, the current determination section 1616 determines a control current I(m, n) to be outputted to the lean actuator 1600, based on the estimated lean torque value Tl(m, n). Therefore, the current determination section 1616 stores a control current determination table as shown by TABLE 4.

TABLE 4

| ... Tl(1, −5) | Tl(1, −4) | Tl(1, −3) | Tl(1, −2) | Tl(1, −1) | Tl(1, 0) = 0 | Tl(1, 1) | Tl(1, 2) | Tl(1, 3) | Tl(1, 4) | Tl(1, 5) ... |
|---|---|---|---|---|---|---|---|---|---|---|
| ... I(1, −5) | I(1, −4) | I(1, −3) | I(1, −2) | I(1, −1) | I(1, 0) = 0 | I(1, 1) | I(1, 2) | I(1, 3) | I(1, 4) | I(1, 5) ... |
| ... Tl(2, −5) | Tl(2, −4) | Tl(2, −3) | Tl(2, −2) | Tl(2, −1) | Tl(2, 0) = 0 | Tl(2, 1) | Tl(2, 2) | Tl(2, 3) | Tl(2, 4) | Tl(2, 5) ... |
| ... I(2, −5) | I(2, −4) | I(2, −3) | I(2, −2) | I(2, −1) | I(2, 0) = 0 | I(2, 1) | I(2, 2) | I(2, 3) | I(2, 4) | I(2, 5) ... |
| ... Tl(3, −5) | Tl(3, −4) | Tl(3, −3) | Tl(3, −2) | Tl(3, −1) | Tl(3, 0) = 0 | Tl(3, 1) | Tl(3, 2) | Tl(3, 3) | Tl(3, 4) | Tl(3, 5) ... |
| ... I(3, −5) | I(3, −4) | I(3, −3) | I(3, −2) | I(3, −1) | I(3, 0) = 0 | I(3, 1) | I(3, 2) | I(3, 3) | I(3, 4) | I(3, 5) ... |
| ... Tl(4, −5) | Tl(4, −4) | Tl(4, −3) | Tl(4, −2) | Tl(4, −1) | Tl(4, 0) = 0 | Tl(4, 1) | Tl(4, 2) | Tl(4, 3) | Tl(4, 4) | Tl(4, 5) ... |
| ... I(4, −5) | I(4, −4) | I(4, −3) | I(4, −2) | I(4, −1) | I(4, 0) = 0 | I(4, 1) | I(4, 2) | I(4, 3) | I(4, 4) | I(4, 5) ... |
| ... Tl(5, −5) | Tl(5, −4) | Tl(5, −3) | Tl(5, −2) | Tl(5, −1) | Tl(5, 0) = 0 | Tl(5, 1) | Tl(5, 2) | Tl(5, 3) | Tl(5, 4) | Tl(5, 5) ... |
| ... I(5, −5) | I(5, −4) | I(5, −3) | I(5, −2) | I(5, −1) | I(5, 0) = 0 | I(5, 1) | I(5, 2) | I(5, 3) | I(5, 4) | I(5, 5) ... |
| ... ... | ... | ... | ... | ... | ... | ... | ... | ... | ... | ... |

In the control current determination table, estimated lean torque values Tl (m, n) and control current values I (m, n) are stored in association with each other. The control current I (m, n) is a current that the lean actuator 1600 requires to output a posture control torque Tc corresponding to the assist rate (for example, 20%) of the estimated lean torque value Tl (m, n) to the lower cross member 1052. The lean actuator 1600 outputs a posture control torque Tc corresponding to 20% of the estimated lean torque value Tl (m, n) to the lower cross member 1052. Accordingly, the rider only needs to tilt the vehicle body frame 1021 to apply 80% of the estimated lean torque value Tl (m, n) to the lower cross member 1052. In this way, the lean actuator 1600 assists the rider's manipulation to tilt the vehicle body frame 1021. The assist rate is an arbitrary value and may be a value other than 20%. In order to allow the rider to cause the vehicle body frame 1021 to lean with less power, the assist rate should be more than 20%. In order to allow the rider to cause the vehicle body frame 1021 to lean with more power, the assist rate should be less than 20%. The assist rate may be a negative value. In this case, the lean actuator 1600 outputs a posture control torque Tc to inhibit the rider's manipulation to cause the vehicle body frame 1021 to lean.

When the value n is positive, the control current I (m, n) is a positive value. In this case, the greater the value n is, the greater the control current I (m, n) is. Also, the greater the value m is, the greater the control current I (m, n) is. On the other hand, when the value n is negative, the control current I (m, n) is a negative value. In this case, the smaller the value n is, the smaller the control current I (m, n) is (the greater the absolute value of the control current I (m, n) is). Also, the greater the value m is, the smaller the control current I (m, n) is (the greater the absolute value of the control current I(m, n) is).

The lean actuator 1600 outputs a posture control torque Tc to the lower cross member 1052 based on the control current I(m, n) outputted from the posture control actuator controller 1606. When receiving a positive control current I (m, n), the lean actuator 1600 outputs a posture control torque Tc to cause a counterclockwise rotation of the lower cross member 1052. In this case, the greater the absolute value of the control current I(m, n) is, the greater the absolute value of the posture control torque Tc is. Then, in a view in the backward direction B, the vehicle body frame 1021 rotates clockwise (in the positive direction) around the roll axis Ax at a roll rate ω. When receiving a negative control current I(m, n), the lean actuator 1600 outputs a posture control torque Tc to cause a clockwise rotation of the lower cross member 105. In this case, the greater the absolute value of the control current I(m, n) is, the greater the absolute value of the posture control torque Tc is. Then, in a view in the backward direction B, the vehicle body frame 1021 rotates counterclockwise (in the negative direction) around the roll axis Ax at a roll rate ω.

Next, operations of the posture control actuator controller 1606 will be described with reference to the drawings. FIG. 13 is a flowchart showing operations performed by the posture control actuator controller 1606. The posture control actuator controller 1606 performs a process that will be described below along a software program stored in a storage device (not shown).

The process is started when an ignition source of the leaning vehicle 1b is turned on. As long as the ignition source is on, the roll rate sensor 1602 keeps outputting the roll rate ω to the posture control actuator controller 1606. Also, the speed sensor 1604 keeps outputting the speed V to the posture control actuator controller 1606.

The torque estimation section 1614 obtains the roll rate ω from the roll rate sensor 1602 (step S11). Further, the torque estimation section 1614 obtains the speed V from the speed sensor 1604 (step S12).

Next, the torque estimation section 1614 identifies a roll rate ω(n) closest to the roll rate ω. Further, the torque estimation section 1614 identifies a speed V(m) closest to the speed V. Then, the torque estimation section 1614 determines an estimated lean torque value Tl (m, n) corresponding to the roll rate ω(n) and the speed V(m) with reference to the the estimation lean torque table as shown by TABLE 3 (step S13).

Next, the current determination section 1616 determines a control current I(m, n) corresponding to the estimated lean torque value Tl (m, n) determined at step S13 (step S14). The current determination section 1616 outputs the control current I(m, n) to the lean actuator 1600. The lean actuator 1600 outputs a posture control torque Tc corresponding to the control current I(m, n) to the lower cross member 1052. Thereafter, the process returns to step S11. The process from step S11 to S14 is repeated until the ignition source is switched from on to off.

[Effects]

The roll rate sensor 1602 of the posture control actuator unit 1599 can detect the roll rate ω of the vehicle body frame 21 with high accuracy for the same reasons as described above in connection with the posture control actuator unit 599. In the posture control actuator unit 1599, it is easy to make the axis for the detection of the roll rate ω carried out by the roll rate sensor 1602 almost parallel to the roll axis Ax of the vehicle body frame 1021 for the same reason as described above in connection with the posture control actuator unit 599. Also, the posture control actuator unit 1599 can be downsized for the same reason as described above in connection with the posture control actuator unit 599. Accordingly, the posture control actuator controller 1606 of the posture control actuator unit 1599 can control the posture of the vehicle body frame 1021 accurately for the same reasons as described above in connection with the posture control actuator unit 599.

Other Embodiments

The embodiments and modifications described or illustrated herein are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combination of features of the embodiments and modifications), adaptations and alterations as would be appreciated by those in the art based on the embodiments and modifications disclosed herein. The limitations in the claims are to be interpreted broadly based on the language employed in the claims and not limited to the embodiments described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

In the leaning vehicle 1a, instead of the roll rate sensor 602, a yaw rate sensor or a pitch rate sensor may be supported by the ESP actuator 600. The yaw rate sensor detects a yaw rate. As the vehicle body frame 21 is rotating around a yaw axis, the rotation angle of the vehicle body frame 21 around a yaw axis changes, and the yaw rate sensor is configured to detect the yaw rate that is the amount of change per unit time of the rotation angle of the vehicle body frame 21 around the yaw axis. The yaw axis is an axis extending along the up-down direction UD. The pitch rate sensor detects a pitch rate. As the vehicle body frame 21 is rotating around a pitch axis, the rotation angle of the vehicle body frame 21 around the pitch axis changes, and the pitch rate sensor is configured to detect the pitch rate that is the amount of change per unit time of the rotation angle of the vehicle body frame 21 around the pitch axis. The pitch axis is an axis extending along the left-right direction LR. As descried above, the sensor supported by the EPS actuator 600 may be any angular rate sensor that detects the amount of change per unit time of a rotation angle of the vehicle body frame 21 around a rotation axis, the rotation angle changing as the vehicle body frame 21 is rotating around the rotation axis.

In the leaning vehicle 1b, instead of the roll rate sensor 1602a, a yaw rate sensor or a pitch rate sensor may be supported by the lean actuator 1600. The yaw rate sensor detects a yaw rate. As the vehicle body frame 1021 is rotating around a yaw axis, the rotation angle of the vehicle body frame 21 around the yaw axis changes, and the yaw rate sensor is configured to detect the yaw rate that is the amount of change per unit time of the rotation angle of the vehicle body frame 1021 around the yaw axis. The yaw axis is an axis extending along the up-down direction UD. The pitch rate sensor detects a pitch rate. As the vehicle body frame 1021 is rotating around a pitch axis, the rotation angle of the vehicle body frame 1021 around the pitch axis changes, and the pitch rate sensor is configured to detect the pitch rate that is the amount of change per unit time of the rotation angle of the vehicle body frame 1021 around the pitch axis. The pitch axis is an axis extending along the left-right direction LR. As described above, the sensor supported by the lean actuator 1600 may be any angular rate sensor that detects the amount of change per unit time of a rotation angle of the vehicle body frame 1021 around a rotation axis, the rotation angle changing as the vehicle body frame 1021 is rotating around the rotation axis.

In the leaning vehicle 1a, the posture control actuator controller 606 may control the vehicle body frame 21 by using an angular rate detected by an angular rate sensor other than the angular rate sensor supported by the ESP actuator 600. Also, in the leaning vehicle 1b, the posture control actuator controller 1606 may control the vehicle body frame 1021 by using an angular rate detected by an angular rate sensor other than the angular rate sensor supported by the lean actuator 1600.

The posture control torque Tc may be used for any other purpose than the purpose of posture control of the vehicle body frame 21 or 1021 around the roll axis Ax. The posture control torque Tc may be used for posture control of the vehicle body frame 21 or 1021 around the yaw axis or for posture control of the vehicle body frame 21 or 1021 around the pitch axis.

The leaning vehicles 1, 1a and 1b each may include a steering torque sensor configured to detect the steering torque T. The posture control actuator controller 606 may control the EPS actuator 600 based on the steering torque T or not based on the steering torque T. The posture control actuator controller 1606 may control the lean actuator 1600 based on the steering torque T or not based on the steering torque T.

The leaning vehicles 1, 1a and 1b each may include a roll sensor configured to detect the roll angle θ. In this case, the posture control actuator controller 606 may control the ESP actuator 600 based on the roll angle θ or not based on the roll angle θ. The posture control actuator controller 1606 may control the lean actuator 1600 based on the roll angle θ or not based on the roll angle θ.

Each of the leaning vehicle 1 and 1a may be a vehicle including two front wheels and at least one rear wheel, like the leaning vehicle 1b. The leaning vehicle 1b needs to include at least one rear wheel.

The link mechanism 1005 of the leaning vehicle 1b is a parallelogram link mechanism. However, the link mechanism 1005 does not need to be a parallelogram link mechanism, and may be a double wishbone link mechanism.

In the leaning vehicle 1a, the posture control actuator controller 606 determines an estimated steering torque T(m, n) based on the speed V and the roll rate ω, and thereafter determines a control current value I (m, n) based on the estimated steering torque T(m, n). However, the posture control actuator controller 606 may determine a control current I(m, n) based on the speed V and the roll rate ω. In this case, the posture control actuator controller 606 stores a table in which control current values I (m, n) are stored in association with various values of the speed V(m) and various values of the roll rate ω(n). Instead of such a table, a mathematical expression or a map may be used for the determination of an estimated steering torque T(m, n) and/or the determination of a control current I(m, n).

In the leaning vehicle 1b, the posture control actuator controller 1606 determines an estimated lean torque value Tl(m, n) based on the speed V and the roll rate ω, and thereafter determines a control current value I (m, n) based on the estimated lean torque value Tl(m, n). However, the posture control actuator controller 1606 may determine a control current I(m, n) based on the speed V and the roll rate ω. In this case, the posture control actuator controller 1606 may store a table in which control current values I (m, n) are stored in association with various values of the speed V and various values of the roll rate ω. Instead of such a table, a mathematical expression or a map may be used for the determination of an estimated lean torque value Tl (m, n) and/or the determination of a control current I(m, n).

The above-described control method of the EPS actuator 600 based on the speed V and the roll rate ω in the leaning vehicle 1a is only an example, and the control method of the EPS actuator 600 is not limited to this. In the control method of the EPS actuator 600 based on the speed V and the roll rate ω, the estimated steering torque determination table and the control current determination table are not necessarily used. The posture control actuator controller 606, for example, stores a reference control current value that is to be used for determination of a control current value to be outputted to the EPS actuator 600. The reference control current value may be a constant value or may be a variable value that varies in association with any other parameter (for example, temperature) than the speed V and the roll rate ω. Then, the posture control actuator controller 606 may determine a control current value by multiplying the reference control current value with a coefficient determined based on the speed V and the roll rate ω.

The above-described control method of the lean actuator 1600 based on the speed V and the roll rate ω carried out in the leaning vehicle 1b is only an example, and the control method of the lean actuator 1600 is not limited to this. In the control method of the lean actuator 1600 based on the speed V and the roll rate ω, the estimated lean torque determination table and the control current determination table are not necessarily used. The posture control actuator controller 1606, for example, stores a reference control current value that is to be used for determination of a control current value to be outputted to the lean actuator 1600. The reference control current value may be a constant value or may be a variable value that varies in association with any other parameter (for example, temperature) than the speed V and the roll rate ω. Then, the posture control actuator controller 1606 may determine a control current value by multiplying the reference control current value with a coefficient determined based on the speed V and the roll rate ω.

Each of the leaning vehicle 1 and 1a may be a two-wheeled off-road motorcycle, a two-wheeled scooter-type motorcycle, or a moped bicycle.

The roll axis Ax may pass through the roll rate sensor 602 or 1602. In this case, the roll rate sensor 602 or 1602 detects the roll rate ω still more accurately.

When the leaning vehicle 1a is running at a low speed, the posture control torque Tc may be outputted to the steering shaft 62 so as to inhibit the vehicle body frame 21 from leaning in the leftward direction L or the rightward direction R. More specifically, the posture control actuator controller 606 carries out such leaning inhibition control, for example, under the condition of 0 km/h<V≤10 km/h. When the front wheel 3 is steered leftward while the vehicle body frame 21 is leaning in the leftward direction L, a negative roll rate ω occurs, and when the front wheel 3 is steered rightward while the vehicle body frame 21 is leaning in the rightward direction R, a positive roll rate ω occurs.

Therefore, the current determination section 616 outputs a positive control current I(m, n) when the vehicle body frame 21 is leaning in the leftward direction L (when the roll rate ω is a positive value). The EPS actuator 600 outputs a positive posture control torque value Tc to the steering shaft 62. Accordingly, the front wheel 3 is steered leftward, and the vehicle body frame 21 is returning to the upright posture. The current determination section 616 outputs a negative control current I(m, n) when the vehicle body frame 21 is leaning in the rightward direction R (when the roll rate ω is a negative value). The EPS actuator 600 outputs a negative posture control torque value Tc to the steering shaft 62. Accordingly, the front wheel 3 is steered rightward, and the vehicle body frame 21 is returning to the upright posture. In this way, the vehicle body frame 21 of the leaning vehicle 1*a* is inhibited from leaning in the leftward direction L or the rightward direction R. Further, the posture control actuator controller 606 may control the EPS actuator 600 based on the yaw rate in addition to the roll rate ω. The yaw rate is an angular rate of a rotation of the vehicle body frame 21 around an axis extending along the up-side direction UD. Also, depending on the characteristics of the leaning vehicle 1*a*, the posture control actuator controller 606 may control the ESP actuator 600 to assist the leaning motion of the leaning vehicle 1*a*.

The posture control actuator controller 606 may carry out a control process as described below. When the speed V is, for example, greater than 10 km/h, the posture control actuator controller 606 controls the EPS actuator 600 with reference to the estimated steering torque determination table as shown by TABLE 1 and the control current determination table as shown by FIG. 2. However, when the speed V is, for example, equal to or less than 10 km/h, the posture control actuator controller 606 controls the EPS actuator 606 to perform the above-described leaning inhibition control.

When the leaning vehicle 1*b* is running at a low speed, the posture control torque Tc may be outputted to the lower cross member 1052 so as to inhibit the vehicle body frame 1021 from leaning in the leftward direction L or the rightward direction R. More specifically, the posture control actuator controller 1606 carries out the leaning inhibition control, for example, under the condition of 0 km/h<V≤10 km/h. The current determination section 1616 outputs a negative control current I(m, n) when the vehicle body frame 1021 is leaning in the leftward direction L (when the roll rate ω is a positive value). The lean actuator 1600 outputs a negative posture control torque value Tc to the lower cross member 1052. Accordingly, the lower cross member 1052 rotates clockwise relative to the vehicle body frame 1021 in a view in the backward direction b, and the vehicle body frame 1021 is returning to the upright posture. The current determination section 1616 outputs a positive control current I(m, n) when the vehicle body frame 1021 is leaning in the rightward direction R (when the roll rate ω is a negative value). The lean actuator 1600 outputs a positive posture control torque value Tc to the lower cross member 1052. Accordingly, the lower cross member 1052 rotates counterclockwise relative to the vehicle body frame 1021 in a view in the backward direction b, and the vehicle body frame 1021 is returning to the upright posture. In this way, the vehicle body frame 1021 of the leaning vehicle 1*b* is inhibited from leaning in the leftward direction L or the rightward direction R. Further, the posture control actuator controller 1606 may control the lean actuator 1600 based on the yaw rate in addition to the roll rate ω. Also, depending on the characteristics of the leaning vehicle 1*b*, the posture control actuator controller 1606 may control the lean actuator 1600 to assist the leaning motion of the leaning vehicle 1*b*.

The posture control actuator controller 606 does not necessarily use the speed V and may use only the roll rate ω for control of the EPS actuator 600. Alternatively, the posture control actuator controller 606 may control the EPS actuator 600 based on not only the roll rate ω but also any other parameter. The posture control actuator controller 1606 does not necessarily use the speed V and may use only the roll rate ω for control of the lean actuator 1600. Alternatively, the posture control actuator controller 1606 may control the lean actuator 1600 based on not only the roll rate ω but also any other parameter.

The lean actuator 1600 may output the posture control torque Tc to the upper cross member 1051 instead of the lower cross member 1052. Alternatively, the lean actuator 1600 may output the posture control torque Tc to the left side member 1053 or to the right side member 1054.

The roll rate sensor 602 and the posture control actuator controller 606 may be connected to each other by an electrical signal line or an optical fiber. The speed sensor 604 and the posture control actuator controller 606 may be connected to each other by an electrical signal line or an optical fiber. The roll rate sensor 602, the speed sensor 604 and the posture control actuator controller 606 may be connected to one another by a CAN (controller area network) or any other connection means. When a CAN is used, various kinds of information are multiplexed through the line interconnecting the roll rate sensor 602, the speed sensor 604 and the posture control actuator controller 606. A connection means other than a CAN is, for example, connecting the roll rate sensor 602 and the posture control actuator controller 606 by a line and connecting the speed sensor 604 and the posture control actuator controller 606 by a line. Through the line connecting the roll rate sensor 602 and the posture control actuator controller 606, only the roll rate ω is transmitted. Through the line connecting the speed sensor 604 and the posture control actuator controller 606, only the speed V is transmitted.

The roll rate sensor 1602 and the posture control actuator controller 1606 may be connected to each other by an electrical signal line or an optical fiber. The speed sensor 1604 and the posture control actuator controller 1606 may be connected to each other by an electrical signal line or an optical fiber. The roll rate sensor 1602, the speed sensor 1604 and the posture control actuator controller 1606 may be interconnected by a CAN (controller area network) or any other connection means. When a CAN is used, various kinds of information are multiplexed through the line interconnecting the roll rate sensor 1602, the speed sensor 1604 and the posture control actuator controller 1606. A connection means other than a CAN is, for example, connecting the roll rate sensor 1602 and the posture control actuator controller 1606 by a line and connecting the speed sensor 1604 and the posture control actuator controller 1606 by a line. Through the line connecting the roll rate sensor 1602 and the posture control actuator controller 1606, only the roll rate ω is transmitted. Through the line connecting the speed sensor 1604 and the posture control actuator controller 1606, only the speed V is transmitted.

The leaning vehicle 1*b* may further include a posture control actuator controller 606 and an EPS actuator 600. In this case, in the leaning vehicle 1*b*, the posture control actuator controller 606 controls the EPS actuator 600, and the posture control actuator controller 1606 controls the lean actuator 1600. The operations of the posture control actuator controller 606 of the leaning vehicle 1*b* are the same as the operations of the posture control actuator controller 606 of the leaning vehicle 1*a*. Also, the posture control actuator controllers 606 and 1606 may change the assist rate depending on the speed V(m) and/or the roll rate ω(n). For example, when the leaning vehicle 1*b* is running at a low speed, the posture control actuator controller 606 increases the assist rate of the EPS actuator 600, and the posture control actuator controller 1606 decreases the assist rate of the lean actuator 1600. On the other hand, when the leaning vehicle 1b is running at a high speed, the posture control actuator controller 606 decreases the assist rate of the EPS actuator 600, and the posture control actuator controller 1606 increases the assist rate of the lean actuator 1600. However, how the assist rate is changed is not limited to this.

In each of the leaning vehicles 1a and 1b, the posture control actuator unit 599 or 1599 does not need to overlap the center line C in a view in the backward direction b.

Each of the EPS actuator 600 and the lean actuator 1600 outputs a posture control torque Tc. The posture control torque Tc is a force to cause an object to make a rotary movement. However, the EPS actuator 600 or the lean actuator 1600 may be a posture control actuator that causes an object to make any other movement than a rotary movement (for example, a translatory movement).

The roll rate sensor 602 may be fixed on the outer surface of the case of the EPS actuator 600. The roll rate sensor 1602 may be fixed on the outer surface of the case of the lean actuator 1600.

REFERENCE SIGNS LIST 1, 1a, 1b leaning vehicle
2, 1002 vehicle body
3 front wheel
4, 1004 rear wheel
7, 1007 steering mechanism
21, 1021 vehicle body frame
24, 1024 seat
25, 1025 power unit
60, 1060 handlebar
62, 1062 steering shaft
64 front fork
64L, 1033 left shock absorber
64R, 1034 right shock absorber
66 upper bracket
68 under bracket
211, 1211 head pipe
599, 1599 posture control actuator unit
600 EPS actuator
600o posture control actuator
602, 1602 roll rate sensor
602o angular rate sensor
604, 1604 speed sensor
606, 1606 posture control actuator controller
612, 1612 posture control actuator control section
614, 1614 torque estimation section
616, 1616 current determination section
1005 link mechanism
1031 left front wheel
1032 right front wheel
1051 upper cross member
1052 lower cross member
1053 left side member
1054 right side member
1067 tie rod
1314 left front axle
1317 left bracket
1324 right front axle
1327 right bracket
1337 center bracket
1052A front lower cross member
1052B rear lower cross member
1600 lean actuator
Ax roll axis

The invention claimed is:

1. A posture control actuator device for a leaning vehicle, the leaning vehicle including a vehicle body frame that is configured
to lean in a leaning-vehicle-leftward direction when the leaning vehicle is turning left, and
to lean in a leaning-vehicle-rightward direction when the leaning vehicle is turning right,
the posture control actuator device comprising:
a posture control actuator configured to output posture control power to control posture of the vehicle body frame; and
an angular rate sensor configured to detect an angular rate that is an amount of change per unit time of a rotation angle of the vehicle body frame around a rotation axis thereof, the rotation angle changing as the vehicle body frame is rotating around the rotation axis, wherein
the posture control actuator device is supported by the vehicle body frame in such a manner as to be attachable to and detachable from the vehicle body frame,
the posture control actuator and the angular rate sensor are incorporated in such a manner as not to be displaceable relative to each other, and
the angular rate sensor and the posture control actuator are integrated into the posture control actuator device, and the posture control actuator device is attached to the vehicle body frame.

2. The posture control actuator device according to claim 1, further comprising a posture control actuator controller configured to control the posture control actuator based on the angular rate detected by the angular rate sensor, wherein
the posture control actuator controller, the posture control actuator and the angular rate sensor are incorporated in such a manner as not to be displaceable relative to one another.

3. A leaning vehicle comprising:
a vehicle body frame that is configured to lean in a leaning-vehicle-leftward direction when the leaning vehicle is turning left and to lean in a leaning-vehicle-rightward direction when the leaning vehicle is turning right;
at least one steerable wheel supported by the vehicle frame body;
a steering mechanism configured to steer the at least one steerable wheel in accordance with manipulation of a rider of the leaning vehicle; and
a posture control actuator device, including
a posture control actuator configured to output posture control power to control posture of the vehicle body frame, and
an angular rate sensor configured to detect an angular rate that is an amount of change per unit time of a rotation angle of the vehicle body frame around a rotation axis thereof, the rotation angle changing as the vehicle body frame is rotating around the rotation axis, wherein
the posture control actuator device is supported by the vehicle body frame in such a manner as to be attachable to and detachable from the vehicle body frame,
the posture control actuator and the angular rate sensor are incorporated in such a manner as not to be displaceable relative to each other, and
the angular rate sensor and the posture control actuator are integrated into the posture control actuator device, and the posture control actuator device is attached to the vehicle body frame.

4. The leaning vehicle according to claim 3, wherein, in a front view of the leaning vehicle, the posture control actuator device overlaps a center line passing through a center of the vehicle body frame, the center line being perpendicular to a left-right direction of the vehicle body frame and extending along an up-down direction of the vehicle body frame.

5. The leaning vehicle according to claim 3, wherein
the angular rate sensor is a roll rate sensor, and
the rotation axis thereof is a roll axis of the vehicle body frame.

6. The leaning vehicle according to claim 5, wherein:
the steering mechanism includes
   a handlebar to be manipulated by the rider, and
   a steering shaft supported by the vehicle body frame in such a manner as to be rotatable on an axis thereof in accordance with the manipulation of the handlebar of the rider; and
the posture control actuator is configured to output the posture control power to cause the steering shaft to rotate on the axis thereof.

7. The leaning vehicle according to claim 5, wherein:
the at least one steerable wheel includes
   a left steerable wheel that is positioned further leftward than a center of the vehicle body frame in a left-right direction of the vehicle body frame, and is rotatable around a left steerable axle, and
   a right steerable wheel that is positioned further rightward than the center of the vehicle frame in the left-right direction of the vehicle body frame, and is rotatable around a right steerable axle;
the leaning vehicle further comprises a link mechanism including a plurality of link members that are displaceable relative to the vehicle body frame and supporting the left steerable wheel and the right steerable wheel,
the link mechanism being configured
   to cause the leaning vehicle to lean in the vehicle-body-frame-leftward direction when the leaning vehicle is turning left by displacing the vehicle body frame and the plurality of link members relative to one another such that the left steerable axle is positioned higher than the right steerable axle in an up-down direction of the vehicle body frame, and
   to cause the leaning vehicle to lean in the vehicle-body-frame-rightward direction when the leaning vehicle is turning right by displacing the vehicle body frame and the plurality of link members relative to one another such that the right steerable axle is positioned higher than the left steerable axle in the up-down direction of the vehicle body frame; and
the posture control actuator is configured to output the posture control power to displace the vehicle body frame and the plurality of link members relative to one another.

8. The leaning vehicle according to claim 3, wherein
the posture control actuator device further includes a posture control actuator controller configured to control the posture control actuator based on the angular rate detected by the angular rate sensor, and
the posture control actuator controller, the posture control actuator and the angular rate sensor are incorporated in such a manner as not to be displaceable relative to one another.

\* \* \* \* \*